United States Patent
Martin et al.

(10) Patent No.: US 11,174,168 B2
(45) Date of Patent: Nov. 16, 2021

(54) SYNTHETIC MINERAL COMPOUND, COMPOSITION INCLUDING SUCH A COMPOUND AND METHOD FOR MANUFACTURING SUCH A COMPOUND

(71) Applicants: Centre national de la recherche scientifique, Paris (FR); UNIVERSITE PAUL SABATIER TOULOUSE III, Toulouse (FR)

(72) Inventors: François Martin, Saint Foy D'Aigrefeuille (FR); Christophe Le Roux, Avignonet-Lauragais (FR); Pierre Micoud, Peyssies (FR); Marie Claverie, Hossegor (FR); Cyril Aymonier, Begles (FR)

(73) Assignees: CENTRE NATIONAL DE LA RECHERCHE SCIENTIFIQUE, Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 448 days.

(21) Appl. No.: 15/764,018

(22) PCT Filed: Sep. 27, 2016

(86) PCT No.: PCT/FR2016/052454
§ 371 (c)(1),
(2) Date: Mar. 28, 2018

(87) PCT Pub. No.: WO2017/055736
PCT Pub. Date: Apr. 6, 2017

(65) Prior Publication Data
US 2019/0055133 A1 Feb. 21, 2019

(30) Foreign Application Priority Data
Sep. 28, 2015 (FR) .................................... 15 59129

(51) Int. Cl.
*C01B 33/42* (2006.01)
*C01B 33/22* (2006.01)

(52) U.S. Cl.
CPC ............ *C01B 33/425* (2013.01); *C01B 33/22* (2013.01); *C01P 2002/74* (2013.01);
(Continued)

(58) Field of Classification Search
CPC ... C01B 33/22; C01B 33/425; C01P 2002/74; C01P 2002/88; C01P 2004/20; C01P 2002/62; C01P 2002/64
See application file for complete search history.

(56) References Cited

U.S. PATENT DOCUMENTS 2,675,853 A * 4/1954 Hatch .................... C04B 30/00
106/417
3,666,407 A 5/1972 Pfizer
(Continued)

FOREIGN PATENT DOCUMENTS

JP 1988107803 5/1988
JP 2014520743 8/2014

OTHER PUBLICATIONS

W T Granquist et al: "A Study of the Synhesis 0 F Hectorite", Dec. 31, 1959 (Dec. 31, 1959), XP055284386, Retrieved from the Internet: URL:http://www.clays.org/journal/archive/volume 8/8-1-150.pdf [retrieved Jun. 29, 2016] abstract p. 151-p. 152 table 1.
(Continued)

*Primary Examiner* — Pegah Parvini
*Assistant Examiner* — Ross J Christie
(74) *Attorney, Agent, or Firm* — B. Aaron Schulman, Esq.; Stites & Harbison, PLLC

(57) ABSTRACT

The invention relates to a mineral compound, referred to as synthetic mica, with formula $A_r(Si_x\text{-}Ge_{1-x})_4M_zO_{10}(OH)_2$,
(Continued)

Figure 1:
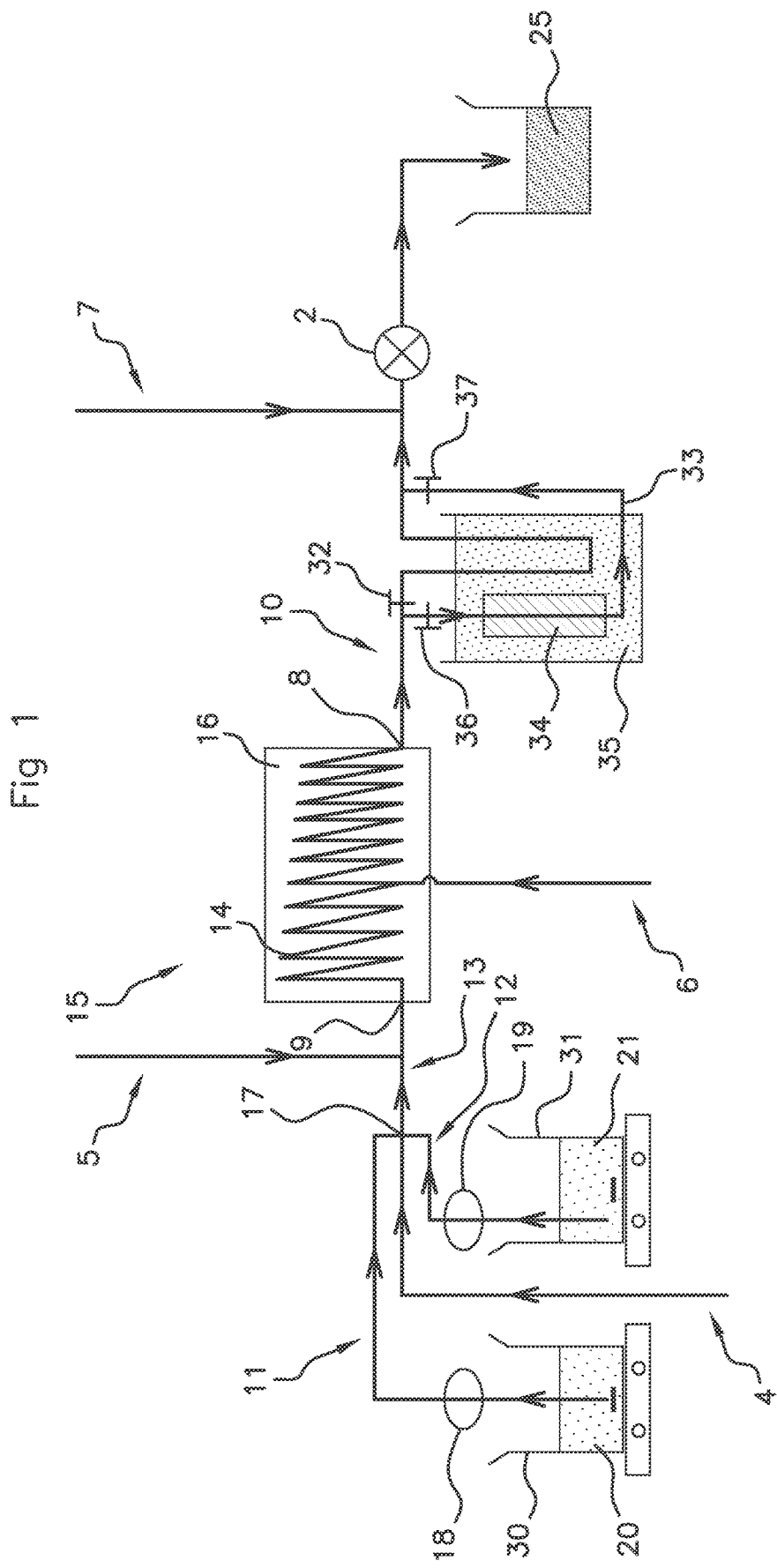

wherein: A designates at least one monovalent interfoliar cation of a metal element, A having the formula $Li_{w(1)}Na_{w(2)}K_{w(3)}Rb_{w(4)}Cs_{sw(5)}$, each instance of w(i) representing a real number in the interval [0; 1], such that the sum of the instances of w(i) is equal to 1; t is a real number in the interval [0.3; 1]; x is a real number in the interval [0; 1]; M designates at least one divalent metal having the formula $Mg_{y(1)}Co_{y(2)}Zn_{y(3)}Cu_{y(4)}Mn_{y(5)}Fe_{y(6)}Ni_{y(7)}Cr$, each instance of y(i) representing a real number in the interval [0; 1], such as the formula (A); and z is a real number in the interval [2.50; 2.85]. The invention also relates to a composition comprising such a compound and a method for preparing such a compound.

$$\sum_{i=1}^{5} w(i) = 1''$$

$$\sum_{i=1}^{8} y(i) = 1''$$

15 Claims, 11 Drawing Sheets

(52) U.S. Cl.
CPC ...... *C01P 2002/88* (2013.01); *C01P 2004/20* (2013.01); *C01P 2004/62* (2013.01); *C01P 2004/64* (2013.01)

(56) References Cited

U.S. PATENT DOCUMENTS

| | | | |
|---|---|---|---|
| 4,045,241 A * | 8/1977 | Daimon | C04B 14/204 |
| | | | 106/461 |
| 9,884,769 B2 | 2/2018 | Le Roux et al. | |
| 10,577,251 B2 | 3/2020 | Le Roux et al. | |
| 2003/0129404 A1* | 7/2003 | Argoitia | C09C 1/0015 |
| | | | 428/403 |
| 2013/0343980 A1* | 12/2013 | Le Roux | C01B 33/38 |
| | | | 423/331 |
| 2014/0205528 A1* | 7/2014 | Le Roux | C01B 33/24 |
| | | | 423/331 |
| 2016/0002056 A1 | 1/2016 | Mcguire et al. | |
| 2018/0105431 A1 | 4/2018 | Le Roux et al. | |

OTHER PUBLICATIONS

Andrzej Krysztafkiewicz et al: "Amorphous magnesium silicate—synthesis, physicochemical properties and surface morphology", Advanced Powders Technology, vol. 15, No. 5, Sep. 1, 2004 (Sep. 1, 2004), pp. 549-565, XP055060839, ISSN: 0921-8831, DOI: 10.1163/1568552042000183 the whole document.

Torii: "The Clay Science Society of Japan NII-Electronic Library Service", Dec. 31, 1987(Dec. 31, 1987), XP055284543, Retrieved from the Internet: URL:http://ci.nii.ac.jp/els/110003709495.pdf?id=ART0004782989&type=pdf&lang=en&host=cinii&order_no=&ppv_type=0&lang_sw=&no=146 7203363&cp= [retrieved on Jun. 29, 2016] abstract p. 2, paragraph "Experimental" p. 3, paragraph "Result".

International Search Report for PCT/FR2016/052454, dated Dec. 9, 2016.

Written Opinion of the International Searching Authority for PCT/FR2016/052454, dated Dec. 9, 2016.

* cited by examiner

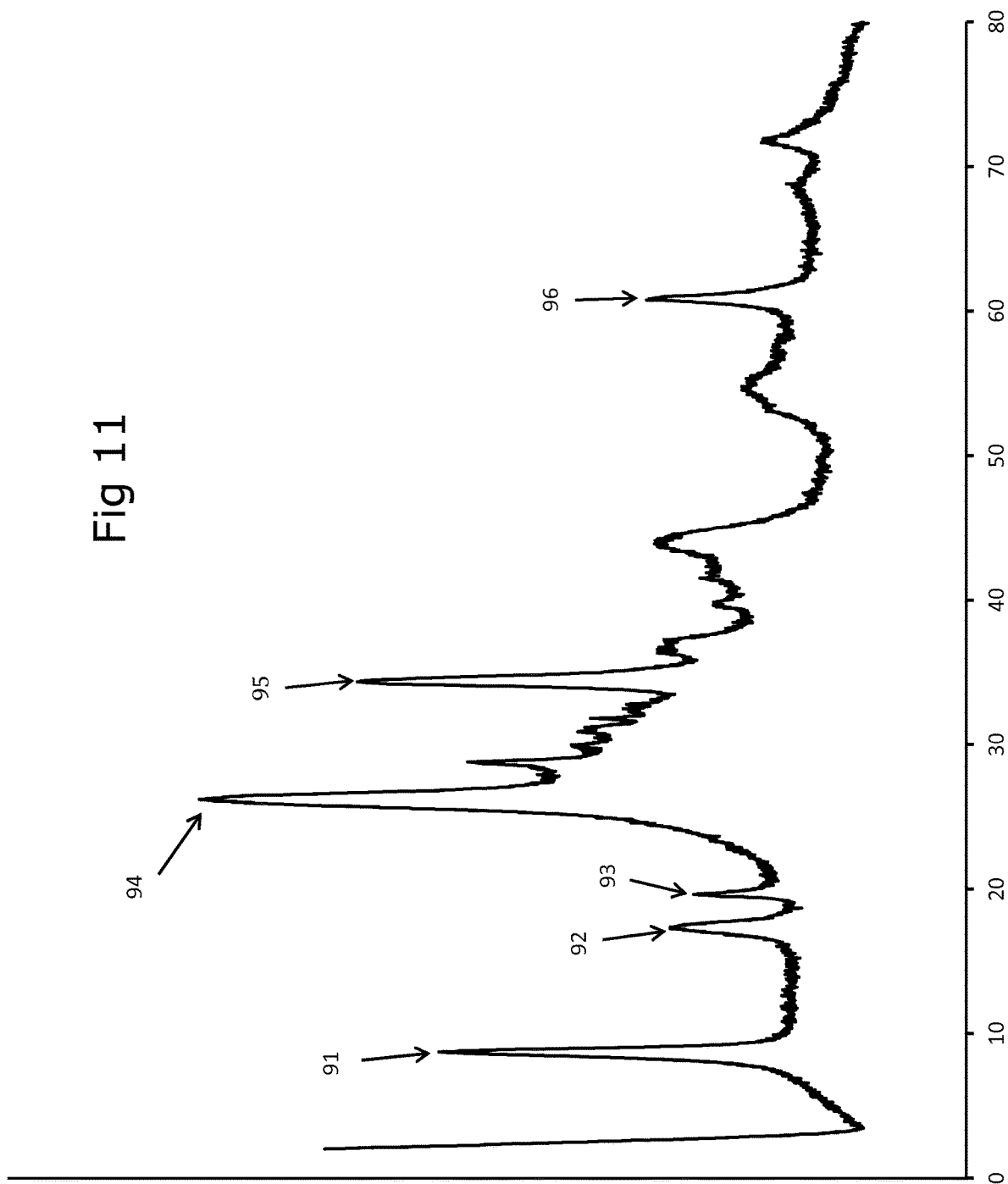

SYNTHETIC MINERAL COMPOUND, COMPOSITION INCLUDING SUCH A COMPOUND AND METHOD FOR MANUFACTURING SUCH A COMPOUND

The invention relates to a synthetic mineral compound, called synthetic mica, and a composition comprising at least one such synthetic mineral compound.

The invention also relates to a method for preparing such a synthetic mineral compound.

Many minerals such as borates or silicates are used in various industrial fields. Phyllosilicates are, for example, used in the form of particles in many industrial sectors, such as: thermoplastics, thermosets, cosmetics, paint or varnishes. Phyllosilicates such as micas are, in particular, used by incorporation into a composition, as an inert charge (in particular for their chemical stability and their thermal insulating properties) or functional charges (for example to enhance the mechanical properties of certain materials). The micas are, for example, used in polymer resins, especially in the form of sheets or bands, as electrical and thermal insulation of copper rods in high voltage motors and alternators, in electrical cables intended to be installed in installations with high safety requirements (such as tunnels, boats, airports, hospitals, etc.), in protections for heating plates or appliances (such as hair dryers, microwave ovens, toasters . . . ) or in automotive joints or in any type of insulating part. Micas may also be used in powder form (without being incorporated in another material) and, in particular, in the form of flakes, for their fire resistance property, their chemical inertness and their acoustic insulation property.

Throughout the text, the term "non-swelling" is used to denote any phyllosilicate or mineral particle whose diffraction line (001) is not affected by a treatment involving contacting with ethylene glycol or glycol, i.e. the interatomic distance corresponding to the diffraction line (001) (X-ray) does not increase after bringing the phyllosilicate into contact with ethylene glycol or glycol.

Micas belong to the family of phyllosilicates. Phyllosilicates are constituted by a regular stack of elementary sheets of crystalline structure, the number of which varies from a few units to several thousand units. Among phyllosilicates (lamellar silicates), the group comprising, in particular, talc, mica and montmorillonite is characterized in that each elementary sheet is constituted by the association of two layers of tetrahedrons located on either side of a layer of octahedra. The octahedral layer of the 2:1 phyllosilicates is formed of two planes of $O^{2-}$ and $OH^-$ ions (in the molar ratio $O^2/OH$ of 2/1). On either side of this median layer, there are two-dimensional networks of tetrahedra, one of whose apexes is occupied by an oxygen of the octahedral layer, while the other three are occupied by substantially coplanar oxygens.

This group corresponds to 2:1 phyllosilicates. In view of their structure, 2:1 phyllosilicates are also referred to as T.O.T. (tetrahedron-octahedron-tetrahedron). The micas are characterized, in particular, by the presence of interfoliary cations in spaces, called interfoliary spaces, located between the elementary sheets. Unlike smectites, micas are said to be non-swelling and are characterized by the absence of water molecules in interfoliary spaces, water molecules implying, in particular, a swelling property of the mineral.

As defined in the scientific publication entitled "Nomenclature of Micas" by Rieder et al. (The Canadian Mineralogist, 1998, Vol 36, pp 41-48), the simplified formula for micas is:

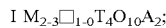

I $M_{2-3}\square_{1-0}T_4O_{10}A_2$;

in which I denotes an interfoliary cation (generally K, Na or Ca, for example); M is generally selected from Li, Fe, Mg, Al or Ti; $\square$ represents a vacancy, T is generally selected from Al, Fe (trivalent) or Si, while A is generally selected from F and OH in particular.

Micas therefore generally comprise many chemical elements including silicon, aluminum or iron in the tetrahedral sites (T in the general formula of Rieder et al.) and lithium, iron, magnesium aluminum or titanium in the octahedral sites (M in the general formula of Rieder et al).

The micas are also characterized by an X-ray diffraction line that is characteristic of a plane (001) located at a distance of between 9.80 Å and 10.30 Å.

On the other hand, micas of natural origin include many chemical elements, in varying proportions and whose nature cannot be controlled. However, in many applications it would be useful to be able to control the nature of the chemical elements present in the micas, in particular the chemical nature of the elements present in octahedral sites and tetrahedral sites.

Also known from the scientific publication "Hydrothermal synthesis of Mn-Mica" by Choi J. et al., (Applied Clay Science, 2009, Vol 46, pp 69-72), are synthetic micas comprising, in particular, manganese and aluminum. However, the compounds obtained according to this publication are limited to micas of particular chemical formula comprising at least aluminum, manganese and silicon.

Methods of preparing hectorite, a compound belonging to the group of smectites, are also known.

The scientific publication entitled "The clay science society of Japan NIII—Electronic Library Service", (Dec. 31, 1987, extract from the Internet http://www.ci.nii.ac.jp/els/110003709495.pdf?.XP055284543) describes a method of synthesizing hectorite from a solution comprising magnesium chloride, sodium silicate and nitric acid and then adding sodium hydroxide and lithium hydroxide before a hydrothermal treatment between 125° C. and 300° C. for 1 to 24 hours.

The scientific publication "A study of the synthesis of hectorite" by W. T. Granquist et al. (Dec. 31, 1959, XP055284386, extract from Internet http://www.clays.org/journal/archive/volume 8/8-1-150.pdf) describes a method of synthesizing hectorite from a solution of magnesium chloride and a silica gel prepared from silicon tetrachloride. This publication also cites a method in which magnesium chloride is slowly added to a potassium silicate solution while boiling.

U.S. Pat. No. 3,666,407 discloses a method of synthesizing hectorite by calcining lithium carbonate and talc and mixing with sodium silicate and sodium carbonate prior to hydrothermal treatment at a temperature in the order of 185° C.

WO 2014/164632 discloses a method for hectorite synthesis comprising zinc, wherein the silicon source may, in particular, be selected from silica, colloidal silica, sodium metasilicate, potassium metasilicate, kaolin and talc. WO 2014/164632 also indicates that a hydrothermal treatment is carried out between 125° C. and 250° C.

However, none of these methods makes it possible to prepare compounds belonging to the group of micas.

In this context, the invention aims to propose new compounds, similar to natural micas, but where the nature of the chemical elements composing them is controlled.

The invention aims in particular to provide novel compounds that may be obtained synthetically at low cost.

The invention also aims to provide novel compounds corresponding to the general formula of micas but devoid of certain chemical elements such as aluminum (Al) or fluorine (F).

The invention also aims to provide novel compounds corresponding to the general formula of micas having a high purity.

The invention also aims to propose novel compounds corresponding to the general formula of micas, and having structural properties very close to those of natural micas, having, in particular, a plane (001) located at a distance of between 9.80 Å and 10.70 Å by X-ray diffraction.

The invention also aims to provide novel compounds corresponding to the general formula of micas which may be in the form of particles of nanometric size.

The invention also aims to provide a method for the preparation of such compounds whose implementation is simple and fast, and is compatible with the constraints of industrial scale production.

The aim of the invention is to propose a method for the preparation of synthetic mineral particles of high purity having a lamellarity, a fine particle size and a low dispersion, as well as a crystalline structure very close to those of natural minerals, in particular natural phyllosilicates and natural mica.

The invention also aims, in particular, to provide a method for preparing synthetic compounds that may be used in various applications instead of natural micas.

To do this, the invention relates to a synthetic mineral compound, called synthetic mica, corresponding to the following formula

$$A_t(Si_xGe_{1-x})_4M_zO_{10}(OH)_2 \quad (I)$$

in which:

A denotes at least one monovalent interfoliary cation (A+) of a metal element, A having the formula $(Li_{w(1)}Na_{w(2)}K_{w(3)}Rb_{w(4)}Cs_{w(5)}$; Li denoting lithium, N denoting sodium, K denoting potassium, Rb denoting rubidium, Cs denoting cesium and each w(i) representing a real number of the interval [0; 1], such that $\Sigma_{i=1}^{8}y(i)=1$, t is a real number of the interval [0.3; 1], Si denotes silicon, Ge denotes germanium, x is a real number of the interval [0; 1], M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; Mg denoting magnesium, Co denoting cobalt, Zn denoting zinc, Cu denoting copper, Mn denoting manganese, Fe denoting iron, Ni denoting nickel, and Cr denoting chromium; each y(i) representing a real number of the interval [0; 1], such that $\Sigma_{i=1}^{8}y(i)=1$ z is a real number in the range [2.50; 2.85], t+2z is a real number of the interval [5.3; 6.0]

O denotes oxygen, and

H denotes hydrogen.

In fact, the inventors have surprisingly found that it is possible to synthesize compounds according to formula (I), and which, therefore, meet the general formula of micas, without requiring the presence of aluminum. In fact, it seems that the compounds according to the invention have no charge deficit in the tetrahedral sites, in which are located the silicon and/or germanium atoms. Quite surprisingly, such compounds may be obtained with a charge deficit of octahedral origin (the octahedral sites being occupied by M).

A compound according to the invention belongs to the group of phyllosilicates. In particular, a compound according to the invention has a crystalline structure corresponding to that of the micas group. In fact, a compound according to the invention has crystalline properties very close to those of natural micas. Advantageously, a compound according to the invention has, in X-ray diffraction, at least one diffraction line characteristic of a plane (001) located at a distance of between 9.70 Å and 10.70 Å, and especially between 9.70 Å and 10.30 Å. In particular and advantageously, a compound according to the invention has, in X-ray diffraction, at least one diffraction line characteristic of a plane (001) located at a distance of between 9.80 Å and 10.30 Å. This diffraction line is preserved after heating the compound according to the invention at a temperature of between 500° C. and 600° C. (for example for one to six hours). Such a diffraction line is characteristic of micas and its preservation after heating (or anhydrous heat treatment) shows that the compounds according to the invention have physical and structural properties very similar to those of natural micas.

On the other hand, advantageously and according to the invention, the said compound does not swell in the presence of ethylene glycol or glycol. The compounds according to the invention are therefore non-swelling, like micas and unlike smectites.

Micas are also characterized by high thermal stability. The compounds according to the invention also have a high thermal stability, especially up to 650° C. (in particular without interlayer water outflow as controllable by thermogravimetric analysis (TGA), by thermodifferential analysis (TDA) or by differential scanning calorimetry analysis (DSC). In particular and advantageously, a compound according to the invention is thermally stable up to 500° C. (especially in air). In particular, the sheet structure of the compounds according to the invention is sustained up to 700° C., and in particular up to 600° C.

All of these characteristics and properties of the compounds according to the invention, i.e. the presence of a diffraction line characteristic of a plane (001) located at a distance of between 9.70 Å and 10.30 Å, especially preserved after heating, their absence of swelling, especially in ethylene glycol or glycol, and the thermal stability of the compounds, demonstrate that they have physical and structural properties corresponding to those of the micas group.

In an advantageous variant of a compound according to the invention, t is a real number of the interval [0.8; 1], z is a real number of the interval [2.5; 2.6].

In addition, in an advantageous variant of a compound according to the invention, the formula (I) is such that t+2z=6.

On the other hand, according to formula (I), a compound according to the invention may comprise, in tetrahedral sites, silicon atoms or germanium atoms or, at the same time, silicon atoms and germanium atoms in variable proportions, so that x varies from zero to one in $(Si_xGe_{1-x})$. In the case where x is equal to one, the compound according to the invention does not comprise Ge.

According to formula (I), a compound according to the invention may comprise, in octahedral sites, a divalent metal of formula M. M may, therefore, be chosen from the group formed by magnesium, cobalt, zinc, copper, manganese, iron, nickel and chromium. In a particularly advantageous variant of a compound according to the invention, M is only magnesium (M=Mg). In this case, the compound according to the invention has the following formula (II):

$$A_t(Si_xGe_{1-x})_4Mg_zO_{10}(OH)_2 \quad (II)$$

Advantageously, the particles of a compound according to the invention of formula (II) is white in color. The particles of a compound according to the invention comprising at least one other metal than magnesium as the M metal, may have other colors (pink, green, brown, beige . . . ).

In other advantageous variants of a compound according to the invention, M comprises magnesium and at least one other metal such as Mn or Ni.

In particular, in an alternative embodiment of a compound according to the invention, y(3) is different from 1. More particularly, in a variant according to the invention, the said compound is devoid of zinc and y(3) is equal to zero.

In particular, in an alternative embodiment of a compound according to the invention, y(6) is different from 1. More particularly, in a variant according to the invention, the said compound is devoid of iron and y(6) is equal to zero. In fact, it may be advantageous in some applications to have compounds devoid of iron or whose iron content is limited.

Advantageously and according to the invention, in formula (I), A represents at least one chemical element chosen from the group formed of lithium (Li), sodium (Na), potassium (K), rubidium (Rb) and cesium (Cs) (such that w(1)=1, w(2)=1, w(3)=1, w(4)=1 or w(5)=1 respectively).

In the formula (I) of a compound according to the invention, A denotes a metal cation arranged in the interfoliary spaces (between the layers) of the said compound, each sheet comprising a sequence of a tetrahedral layer, an octahedral layer and a second tetrahedral layer (i.e. a structure of the TOT type, T denoting a tetrahedral layer and O denoting an octahedral layer). Thus, advantageously, a compound according to the invention is organized according to a solid structure formed of sheets superimposed on each other and separated from each other by at least one space, called an interfoliary space, with each cation A being disposed in the said interfoliary spaces.

In particular, advantageously and according to the invention, A is a non-exchangeable interfoliary cation, i.e. it is stably and durably associated with the structure of synthetic mica. This means, in particular, that it remains associated with the said compound when the compound is suspended in water, for example.

According to a particularly advantageous variant of a compound according to the invention, in formula (I), A denotes potassium. In this case, the compound has the following formula (III):

$K_t(Si_xGe_{1-x})_4M_zO_{10}(OH)_2$ (III)

According to formula (I), a compound according to the invention has a stoichiometric coefficient t relative to the stoichiometric proportion of A of between 0.30 and 1 (inclusive values), and in particular between 0.80 and 1 (inclusive values). The stoichiometric coefficient t is related to the stoichiometric proportion of the metal M whose stoichiometric coefficient is z. In an advantageous variant of a compound according to the invention, the said compound is such that t=1 and z=2.5 and has the following formula (IV):

$A(Si_xGe_{1-x})_4M_{2.5}O_{10}(OH)_2$ (IV).

When, in the formula (IV) above, A is potassium, no germanium is substituted for silicon and M is magnesium, the compound according to the invention has the following formula (V):

$KSi_4Mg_{2.5}O_{10}(OH)_2$ (V),

In another advantageous variant of a compound according to the invention, the said compound is such that t=0.8 and z=2.6 and has the following formula (VI):

$A_{0.8}(Si_xGe_{1-x})_4M_{2.5}O_{10}(OH)_2$ (VI),

When, in the formula (VI) above, A is potassium, no germanium is substituted for silicon and M is magnesium, the compound according to the invention has the following formula (VII):

$K_{0.8}Si_4Mg_{2.6}O_{10}(OH)_2$ (VII).

The invention also relates to a composition comprising at least one compound according to the invention.

The invention also relates to a composition comprising at least one synthetic mineral compound, called synthetic mica, corresponding to the following formula (I):

$A_t(Si_xGe_{1-x})_4M_zO_{10}(OH)_2$ (I)

in which:
A denotes at least one monovalent cation (A+) of a metal element, A having the formula $Li_{w(1)}Na_{w(2)}K_{w(3)}Rb_{w(4)}Cs_{w(5)}$; Li denoting lithium, N denoting sodium, K denoting potassium, Rb denoting rubidium, Cs denoting cesium and each w(i) representing a real number of the interval [0; 1], such that $\Sigma_{i=1}^8 y(i)=1$
t is a real number of the interval [0.3; 1],
Si means silicon,
Ge denotes germanium,
x is a real number of the interval [0; 1],
M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; Mg denoting magnesium, Co denoting cobalt, Zn denoting zinc, Cu denoting copper, Mn denoting manganese, Fe denoting iron, Ni denoting nickel, and Cr denoting chromium; each y(i) representing a real number of the interval [0; 1], such that $\Sigma_{i=1}^8 y(i)=1$
z is a real number in the range [2.50; 2.85]
t+2z is a real number of the interval [5.3; 6.0]
O denotes oxygen, and
H denotes hydrogen.

Advantageously, a compound and a composition according to the invention are free of at least one element chosen from iron, zinc and manganese. In particular and advantageously, a composition according to the invention is free of iron.

On the other hand, it should be noted that a compound according to the invention is free of aluminum and fluorine. In particular and advantageously, a composition according to the invention is also free of at least one element chosen from aluminum and fluorine. Such compositions may be particularly advantageous in certain applications, for example cosmetic applications (in particular as regards aluminum).

In particular and advantageously, a composition according to the invention is free of aluminum.

In particular, advantageously, a composition according to the invention is free of fluorine.

Advantageously, a composition according to the invention is white in color, in particular in the case where it comprises synthetic mica particles according to the invention and corresponding to formula (I) in which M denotes magnesium and/or zinc. A composition according to the invention may also be colored, in particular in cases where it comprises synthetic mica particles according to the invention and corresponding to formula (I) in which y(1) is different from 1, M denoting another metal than magnesium and/or zinc or comprising magnesium and/or zinc and at least one other metal as defined by M.

Throughout the text, the term "thickness" of particles denotes the smallest dimension of the particles, i.e. the size of the particles in the direction c of the crystal lattice of the said particles.

Throughout the text, "largest dimension" of particles denotes the largest dimension of the particles in the plane (a, b) of the crystal lattice of the particles.

The thickness and the largest dimension of the particles are measured by observation through scanning electron microscopy (SEM) or by transmission electron microscopy (TEM).

Advantageously, a composition according to the invention comprises particles of the compound having an average size of less than 500 nm, in particular an average size of between 10 nm and 400 nm (for example as observed by electron microscopy).

Advantageously, a composition according to the invention comprises particles of the compound having a thickness of between 1 nm and 60 nm, in particular between 2 nm and 50 nm, for example in the order of 10 nm. Advantageously, a composition according to the invention comprises particles of the compound having a largest dimension of between 10 nm and 600 nm, in particular between 20 nm and 500 nm, and more particularly between 20 nm and 300 nm.

The invention also relates to a method for preparing a compound of formula (I) below:

$$A_t(Si_xGe_{1-x})_4M_zO_{10}(OH)_2 \quad (I)$$

in which:
A denotes at least one monovalent interfoliary cation (A+) of a metal element, A having the formula $Li_{w(1)}Na_{w(2)}K_{w(3)}Rb_{w(4)}Cs_{w(5)}$; Li denoting lithium, N denoting sodium, K denoting potassium, Rb denoting rubidium, Cs denoting cesium and each w(i) representing a real number of the interval [0; 1], such that $\Sigma_{i=1}^{8}y(i)=1$
t is a real number of the interval [0.3; 1],
Si denotes silicon,
Ge denotes germanium,
x is a real number of the interval [0; 1],
M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; Mg denoting magnesium, Co denoting cobalt, Zn denoting zinc, Cu denoting copper, Mn denoting manganese, Fe denoting iron, Ni denoting nickel and Cr denoting chromium; each y(i) represents a real number of the interval [0; 1], such that $\Sigma_{i=1}^{8}y(i)=1$
z is a real number in the range [2.50; 2.85]
t+2z is a real number of the interval [5.3; 6.0]
O denotes oxygen, and
H denotes hydrogen, method in which:
a precursor gel of the compound of formula (I) is prepared by a co-precipitation reaction between:
at least one source of at least one chemical element selected from the group consisting of silicon and germanium, said source of the chemical element selected from the group consisting of silicon and germanium being chosen from the group consisting of potassium metasilicate and potassium metagermanate,
at least one metal salt of the divalent metal M,
the molar proportion $(Si_xGe_{1-x})/M$ during the preparation of the precursor gel being in the range [2/1.425; 1.6]
at least one hydroxide of formula AOH is added to said precursor gel, so that the molar proportion A/M is at least equal to t/z,
a solvothermal treatment is carried out on the precursor gel at a temperature of between 300° C. and 600° C. (inclusive values).

In fact, the inventors have found with great surprise that by bringing into contact the above reagents while respecting the stoichiometric proportions of the compound of formula (I) with respect to the molar $(Si_xGe_{1-x})/M$ and A/M, a precursor gel was obtained making it possible, after solvothermal treatment, to obtain a compound of formula (I) having an octahedral charge deficit but corresponding structurally to a synthetic mica, particularly as regards the interfoliary distance. This, and, in particular, the simplicity of this method, is all the more surprising in that it allows a synthetic mica to be obtained, i.e. a non-swelling synthetic mineral, and not a swelling synthetic mineral belonging to the family close to smectites. In fact, the synthesis of a non-swelling synthetic mineral such as a mica with a tetrahedral charge deficit (including aluminum) usually requires very high pressures and temperatures; while it is easier to prepare phyllosilicate compounds with octahedral deficits, smectites for example.

In addition, it should be noted that the hydroxide of formula AOH added to the precursor gel may also come from any compound suitable for generating at least one hydroxide of formula AOH by reaction with the fluid medium in which the solvothermal treatment is carried out. The hydroxide of formula AOH may, for example, be generated in part by the addition of an alkali metal alkoxide (including sodium or potassium, for example) such as potassium ethoxide in the solvothermal treatment medium.

Advantageously and according to the invention, during the preparation of the precursor gel, at least one acid, in particular an acid selected from the group consisting of mineral acids, carboxylic acids (acetic acid for example) and sulfonic acids ($RSO_3H$, R being an organic group). The acid used may, for example, be sulfuric acid ($H_2SO_4$). In particular, advantageously and according to the invention, during the preparation of the precursor gel, at least one acid is added so that the sum of the number of moles of the anion originating from the acid (for example $SO_4^{2-}$ in the case of sulfuric acid) and the number of moles of the anion derived from the metal salt of the metal M is at least equal to or slightly less than the number of moles of potassium from the source of at least one element selected from the group formed of silicon and germanium.

Advantageously and according to the invention, prior to the solvothermal treatment and following the precipitation of the precursor gel, the precursor gel is washed with a rinsing fluid, in particular with a rinsing fluid devoid of any reactive species (starting products for the precursor gel preparation), in particular free of A and M. In particular, the precursor gel is washed with water or else with ethanol. Such washing eliminates the salts formed as by-products of the co-precipitation reaction of the precursor gel.

Advantageously and according to the invention, the solvothermal treatment is carried out continuously, in particular by using a continuous reactor.

Any known continuous reactor may be used in a method according to the invention. Thus, advantageously and according to the invention, the continuous reactor is a continuous reactor of constant volume. In a particularly advantageous variant of a method according to the invention, a continuous reactor chosen from the group consisting of piston reactors (or piston-type flow reactors) is used. It may, for example, be a tubular reactor in which the flow of the reaction medium is carried out in a laminar, turbulent or intermediate regime. In addition, it is possible to use any continuous co-current or countercurrent reactor with respect to the introduction and bringing into contact of the various compositions and/or liquid media contacted in a method according to the invention.

The solvothermal treatment of the reaction medium is carried out in the solvothermal treatment zone of the reactor at a pressure that is suitable for obtaining synthetic particles, particularly as a function of the temperature and the duration of the solvothermal treatment. Advantageously and according to the invention, the solvothermal treatment is carried out at a pressure of between 2 MPa and 50 MPa, in particular between 8 MPa and 40 MPa, and especially between 22 MPa and 30 MPa. This is, in particular, the saturation vapor pressure at the temperature at which the solvothermal treatment is carried out, if the solvent is water.

In a particularly advantageous variant of a method according to the invention, the solvothermal treatment is carried out in an aqueous medium. It is then a hydrothermal treatment. Water may be used as the sole solvent or diluent or mixed with any other fluid.

A method according to the invention may also comprise, after the solvothermal treatment, a step in which the synthetic mica obtained after the solvothermal treatment is subjected to an anhydrous heat treatment. Advantageously and according to the invention, after the solvothermal treatment, an anhydrous heat treatment is carried out at a temperature of between 500° C. and 600° C., for example at 550° C. The duration of such an anhydrous heat treatment may, for example, be between 30 minutes and 24 hours, especially between 45 minutes and 12 hours. Such an anhydrous heat treatment may make it possible to increase the proportion of compound(s) of formula (I) in a composition obtained by a method according to the invention. Such anhydrous heat treatment may also make it possible to increase the crystallinity of the compound obtained. In particular, advantageously and according to the invention, at the end of such an anhydrous heat treatment, a composition is obtained comprising at least 90% by weight, and more particularly at least 95% by weight, of particles of the compound of formula (I) according to the invention.

The invention also relates to a compound, a composition and a method characterized by the combination of all or some of the characteristics mentioned above or below.

Figure 2:
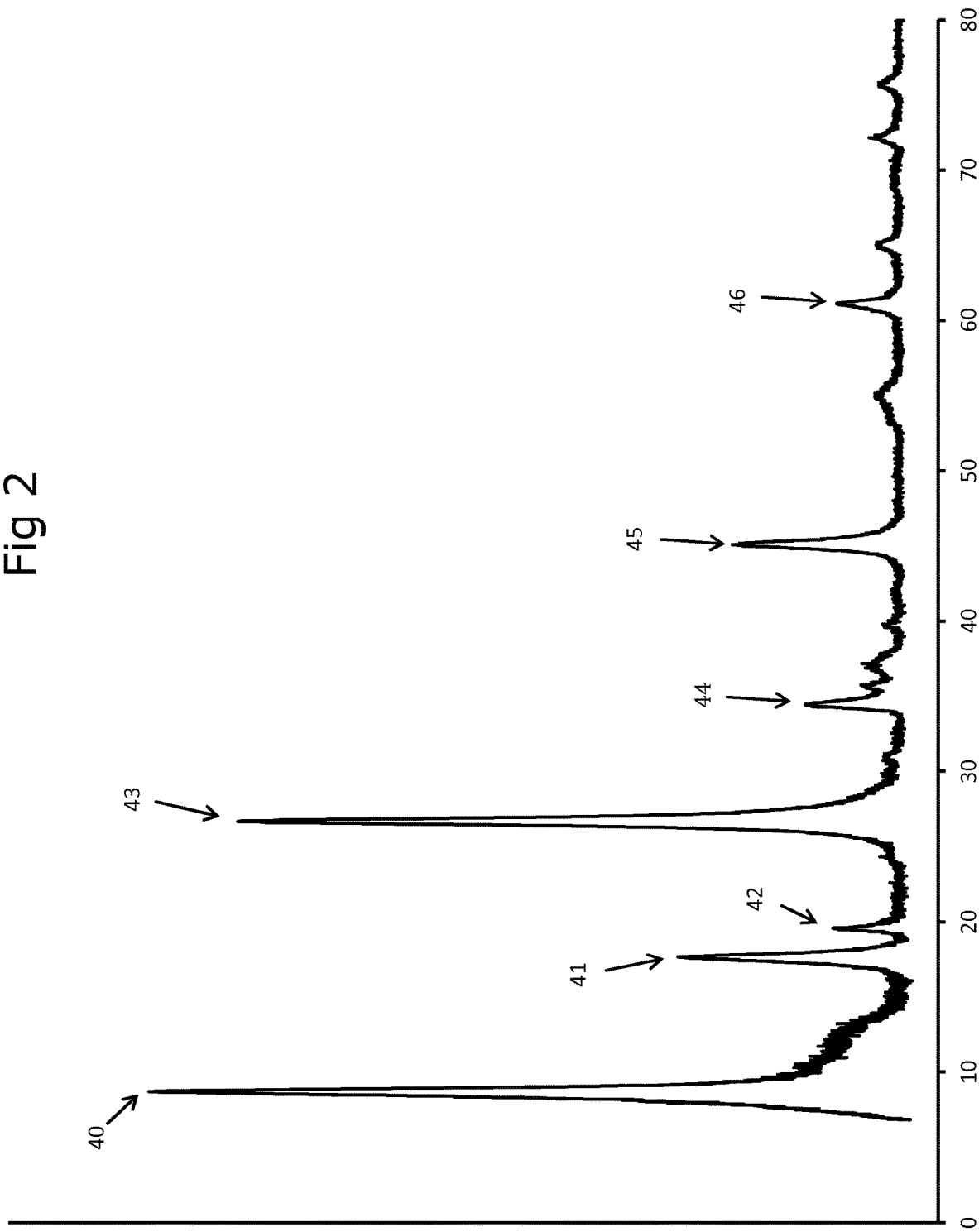
Figure 3:
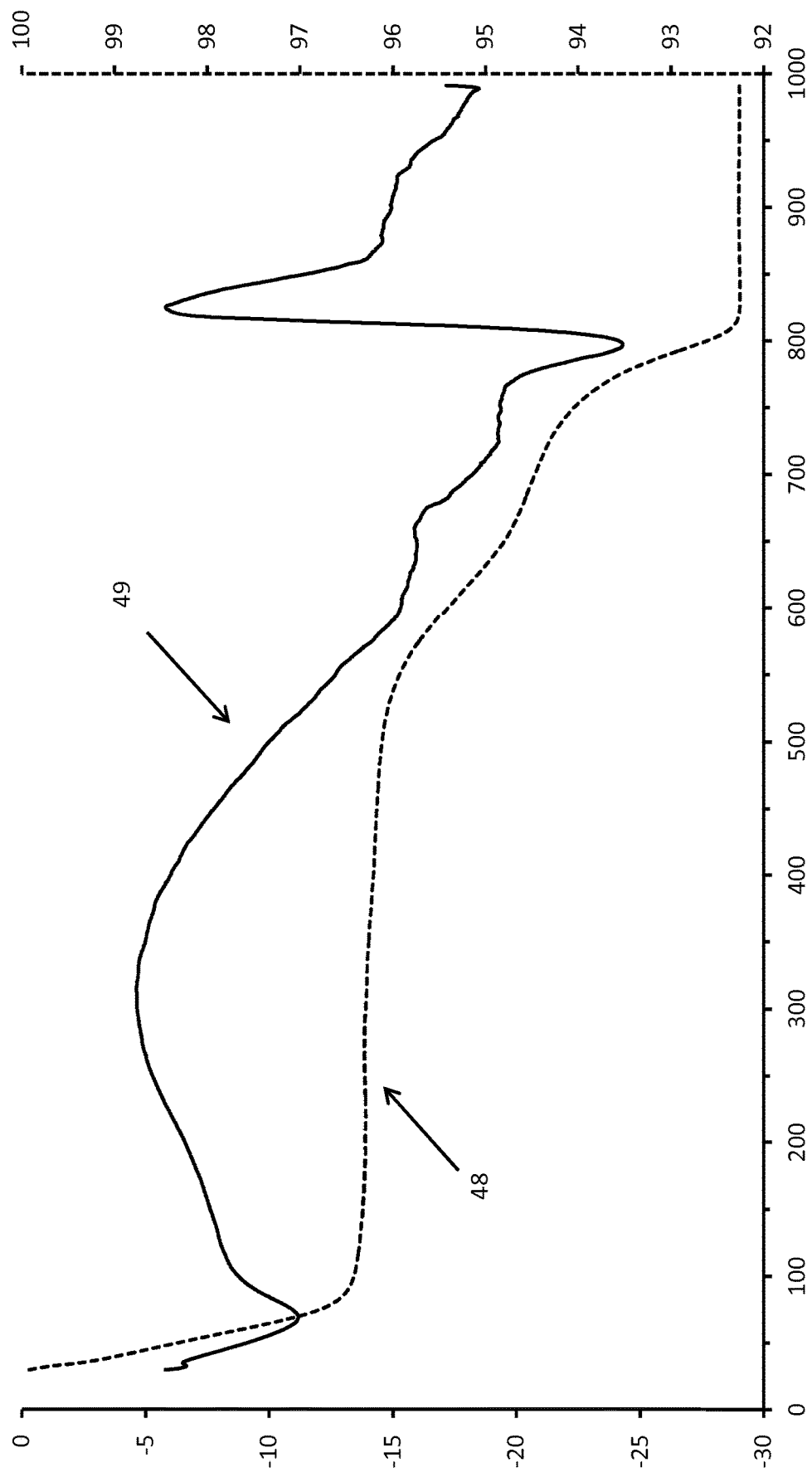
Figure 4:
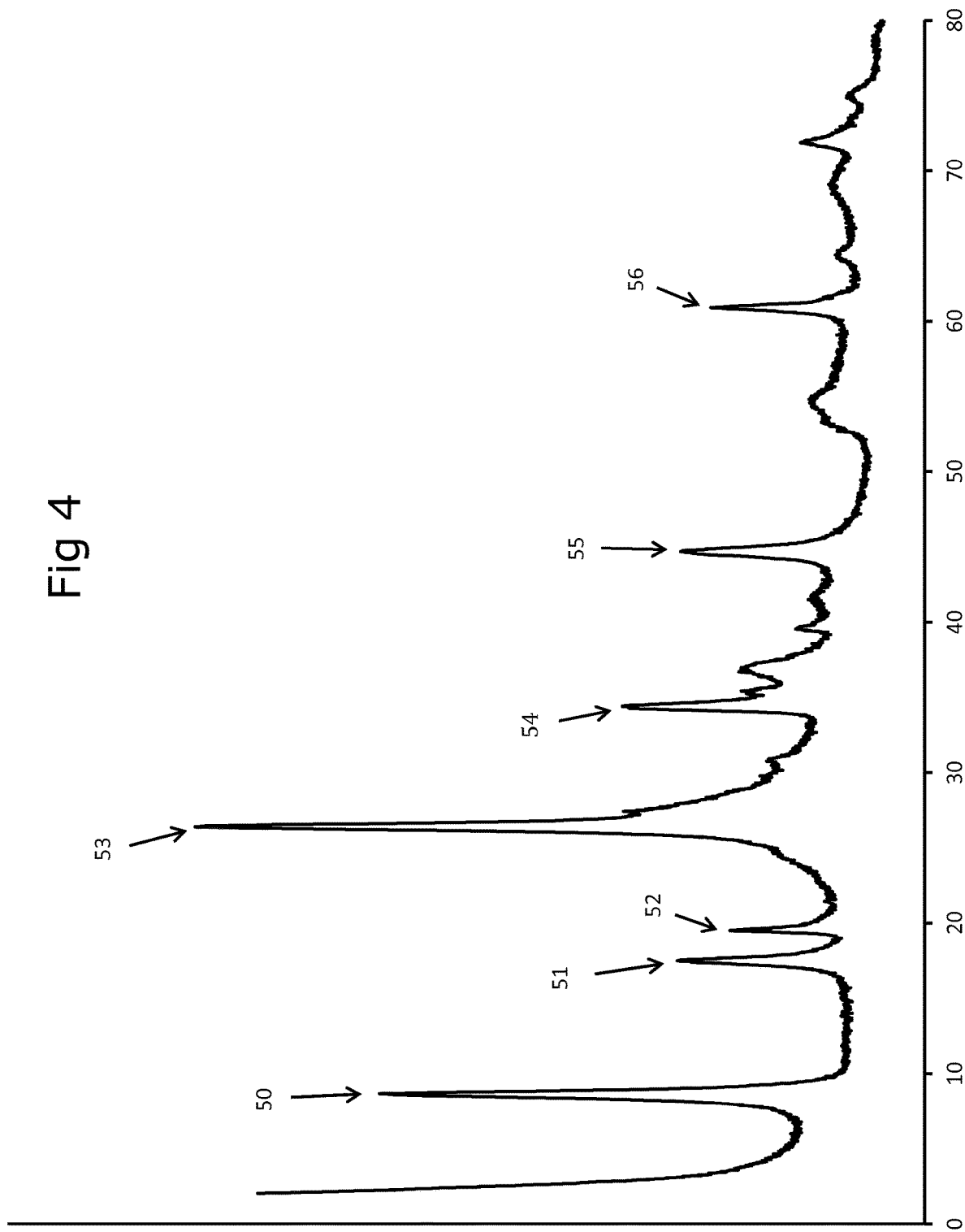
Figure 5:
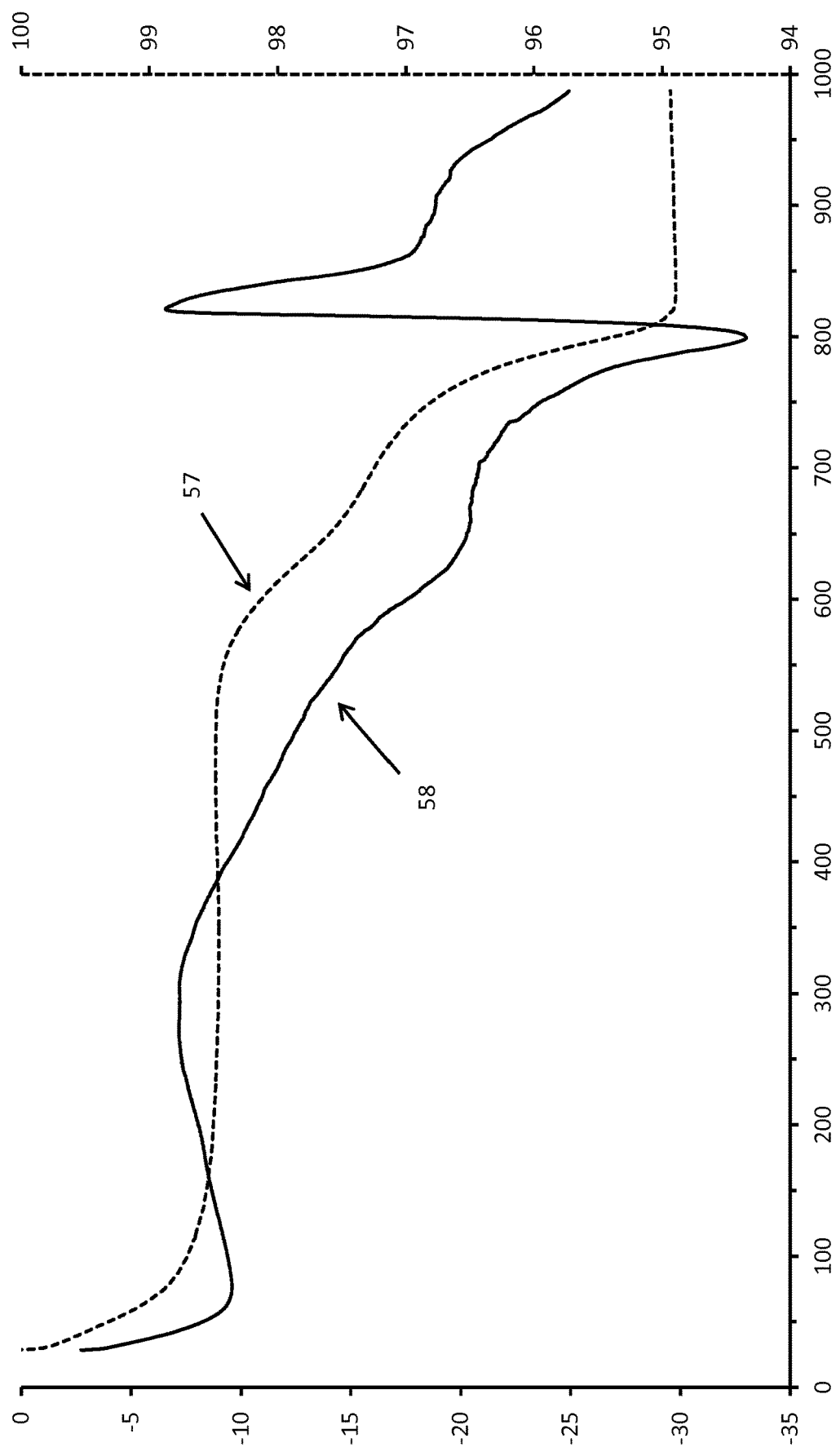
Figure 6:
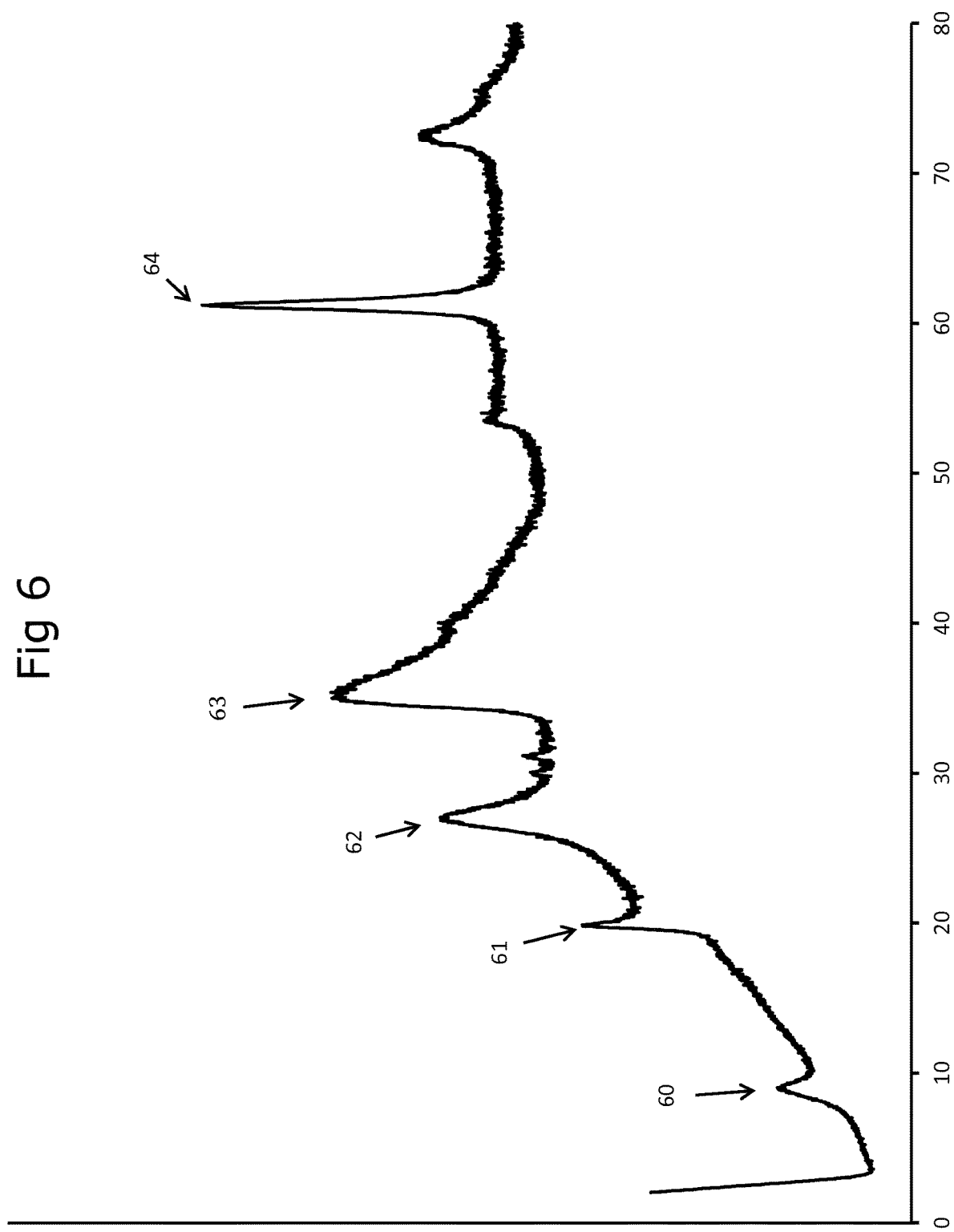
Figure 7:
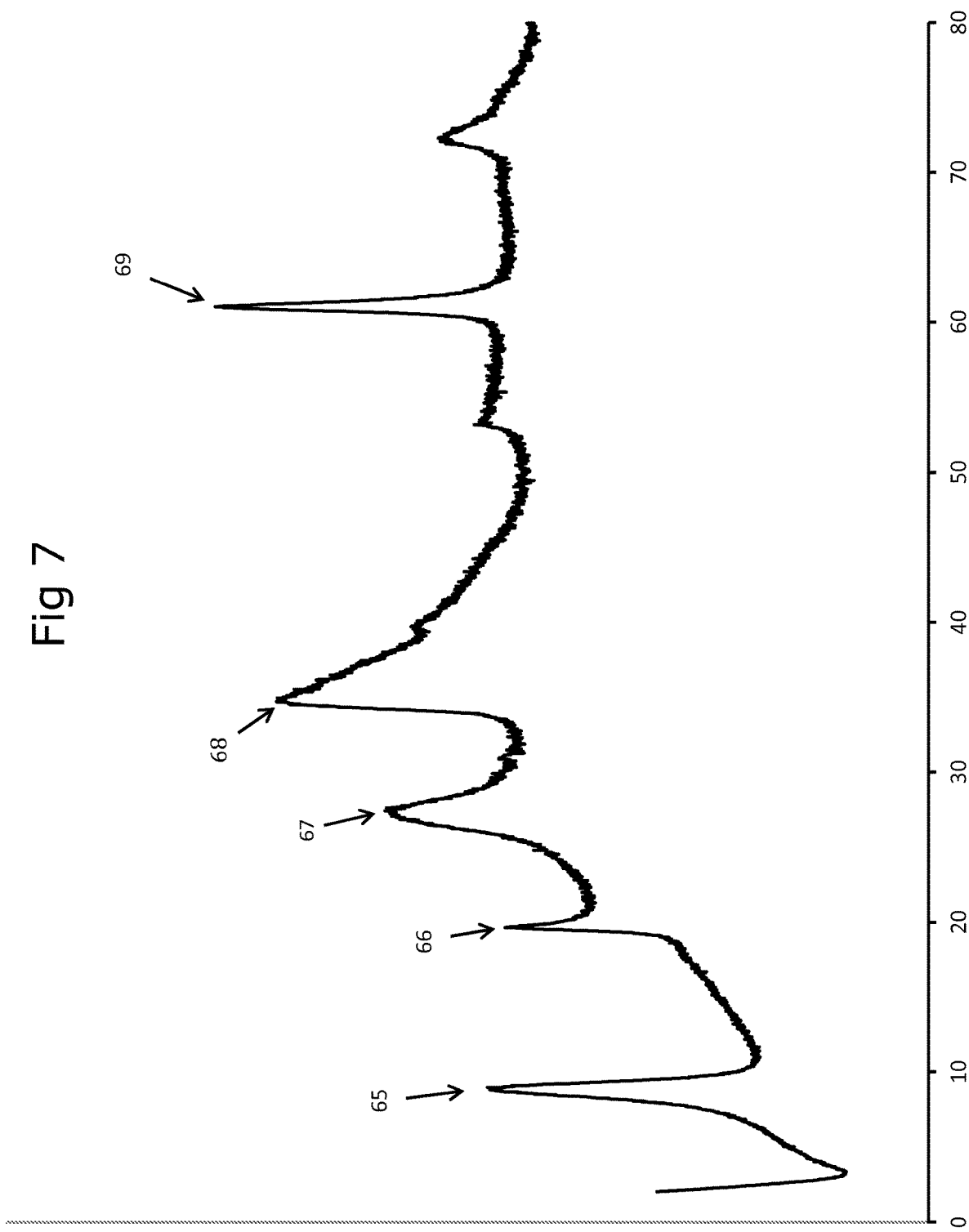
Figure 8:
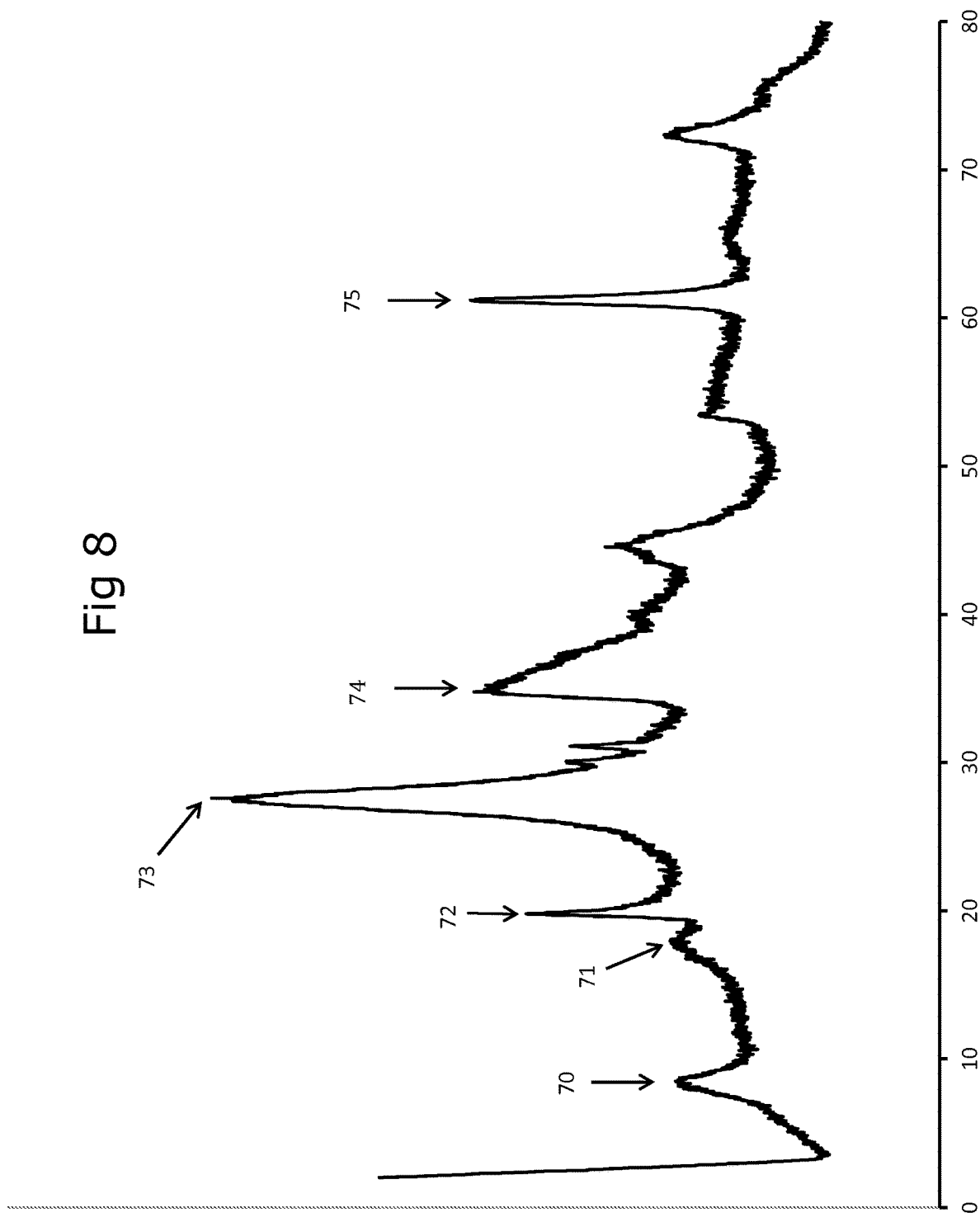

Other objects, features and advantages of the invention will become apparent upon reading the following description of one of its preferred embodiments given by way of a non-limiting example, and which refers to the appended figure, wherein:

FIG. 1 shows a schematic view of a device making it possible to implement a method according to the invention in which the solvothermal treatment is carried out continuously, FIG. 2 represents an X-ray diffractogram of a composition comprising a compound of formula $K_{0.3}Si_4Mg_{2.7}O_{10}(OH)_2$ obtained after a 24-hour hydrothermal treatment at 300° C., FIG. 3 represents thermograms obtained by thermogravimetric analysis (TGA) and by thermodifferential analysis (TDA) of a composition comprising a compound of formula $K_{0.3}Si_4Mg_{2.7}O_{10}(OH)_2$ obtained after a 24-hour hydrothermal treatment at 300° C., FIG. 4 represents an X-ray diffractogram of a composition comprising a compound of formula $K_{0.3}Si_4Mg_{2.7}O_{10}(OH)_2$ obtained after a 24-hour hydrothermal treatment at 300° C., followed by an anhydrous heat treatment at 550° C. for 5 hours, FIG. 5 represents thermograms obtained by thermogravimetric analysis (TGA) and by thermodifferential analysis (TDA) of a composition comprising a compound of formula $K_{0.3}Si_4Mg_{2.7}O_{10}(OH)_2$ obtained after a 24-hour hydrothermal treatment at 300° C., followed by an anhydrous heat treatment at 550° C. for 5 hours, FIG. 6 represents an X-ray diffractogram of a composition comprising a compound of formula $K_{0.3}Si_4Mg_{1.35}O_{10}(OH)_2$ obtained after a 24-hour hydrothermal treatment at 300° C., FIG. 7 represents an X-ray diffractogram of a composition comprising a compound of formula $K_{0.3}Si_4Mg_{1.35}O_{10}(OH)_2$ obtained after a 24-hour hydrothermal treatment at 300° C., followed by a treatment anhydrous thermal at 550° C. for 5 hours, FIG. 8 represents an X-ray diffractogram of a composition comprising a compound of formula $Li_{0.3}Si_4Mg_{2.7}O_{10}(OH)_2$ obtained after a 24-hour hydrothermal treatment at 300° C.

Figure 9:
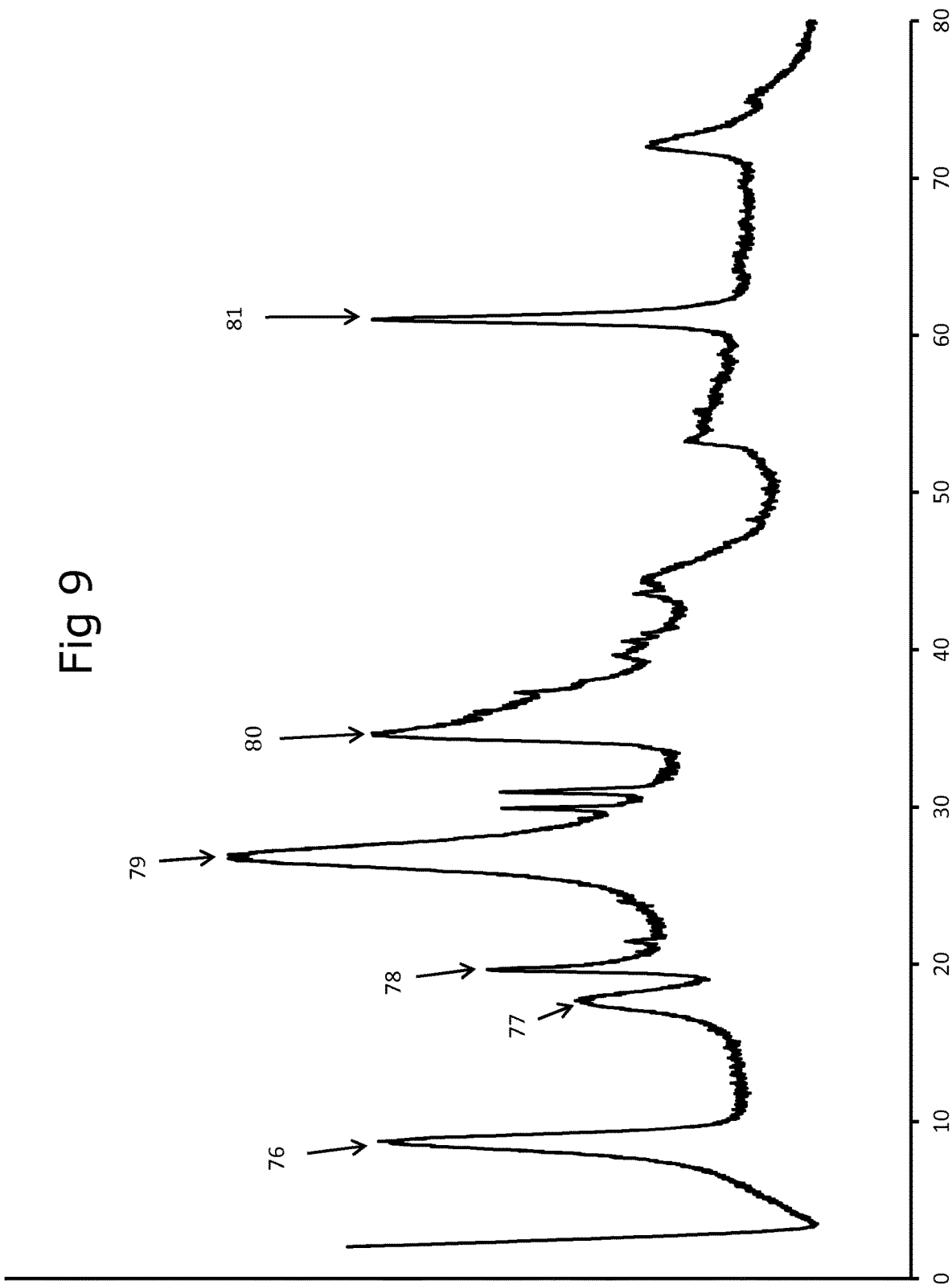
Figure 10:
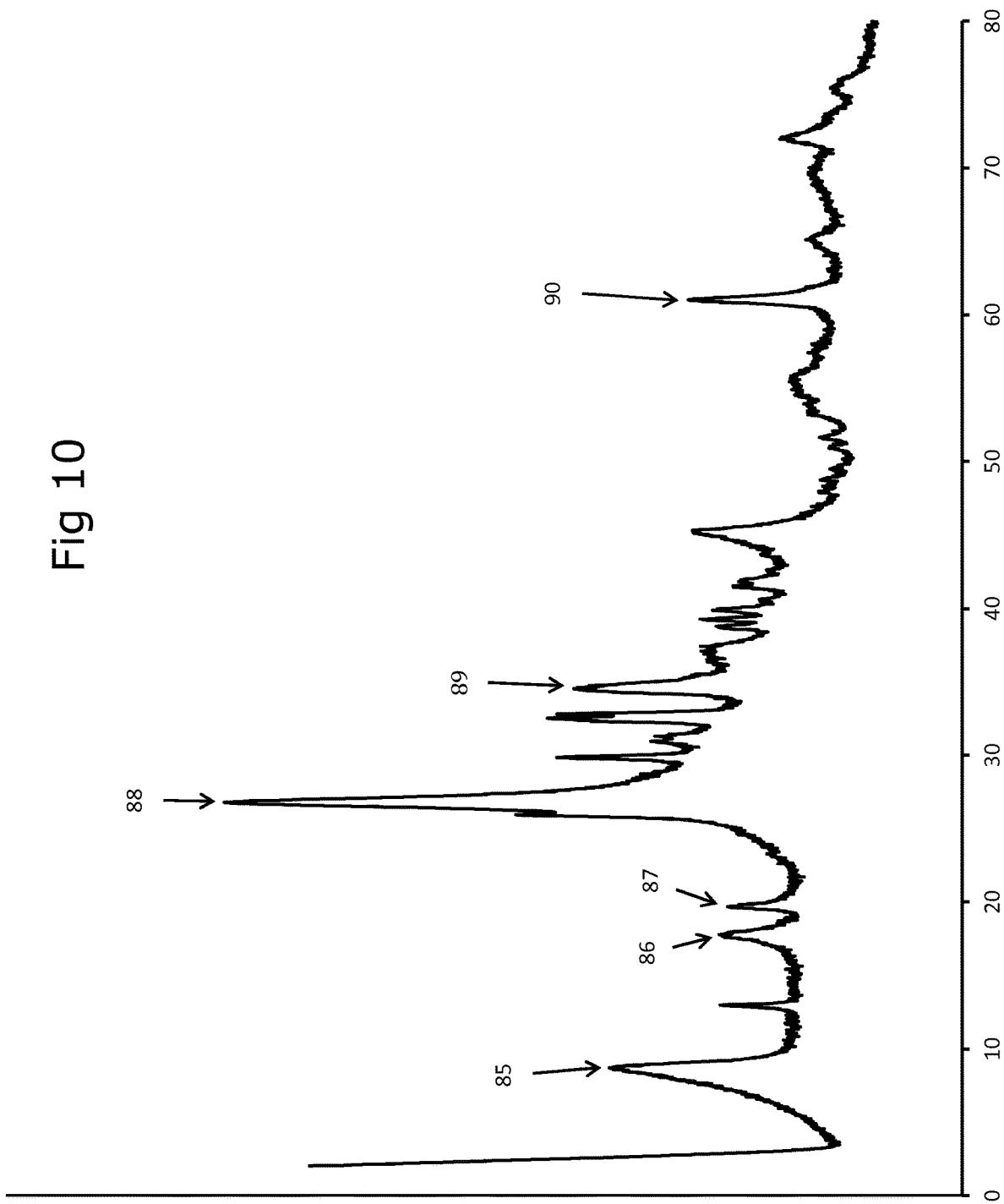

FIG. 9 represents an X-ray diffractogram of a composition comprising a compound of formula $Li_{0.3}Si_4Mg_{2.7}O_{10}(OH)_2$ obtained after a 24-hour hydrothermal treatment at 300° C., followed by an anhydrous heat treatment at 550° C. for 5 hours FIG. 10 represents an X-ray diffractogram of a composition comprising a compound of formula $KSi_4Mg_{2.5}O_{10}(OH)_2$ obtained after a 24-hour hydrothermal treatment at 300° C., FIG. 11 represents an X-ray diffractogram of a composition comprising a compound of formula $KSi_4Mg_{2.5}O_{10}(OH)_2$ obtained after a 24-hour hydrothermal treatment at 300° C., followed by an anhydrous heat treatment at 550° C. for 4 hours.

A—GENERAL PROTOCOL FOR THE PREPARATION OF A COMPOUND AND A COMPOSITION ACCORDING TO THE INVENTION

1/—Preparation of a Precursor Gel of a Compound of Formula (I)

The precursor gel of a compound of formula (I) may be prepared by a coprecipitation reaction involving, as a reagent, at least one source of silicon and/or at least one source of germanium chosen from the group formed of potassium metasilicate and potassium metagermanate, and at least one metal salt of a divalent metal M, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; Mg denoting magnesium, Co denoting cobalt, Zn denoting zinc, Cu denoting copper, Mn denoting manganese, Fe denoting iron, Ni denoting nickel, and Cr denoting chromium; and each y(i) representing a real number of the interval [0; 1], such that $\Sigma_{i=1}^{8} y(i)=1$ This coprecipitation reaction makes it possible to obtain a precursor gel exhibiting the stoichiometry of a synthetic mica corresponding to the formula (I) of a compound according to the invention.

The precursor gel is prepared by a coprecipitation reaction implemented from:

1. an aqueous solution in which at least one metal salt of a divalent metal M is dissolved, for example, in an aqueous solution of a metal sulphate
2. a solution of sulfuric acid ($H_2SO_4$), and
3. an aqueous solution of potassium metasilicate or an aqueous solution of potassium metagermanate, or a mixture of these two solutions in the molar proportions x/(1-x).

The molar proportion $(Si_xGe_{1-x})/M$ during the preparation of this precursor gel is in the range [2/1.425; 1.6], and, in particular, in the range [2/1.3; 1.6].

The preparation of this precursor gel is carried out according to the following protocol:

1. the solution comprising at least one metal salt is mixed with the sulfuric acid solution, 2. the aqueous solution of potassium metasilicate and/or potassium metagermanate is then added thereto, and the precursor gel is formed instantly.

The resulting suspension comprising the precursor gel may be stirred at room temperature (for example at 22.5° C.) for 5 to 30 minutes and then subjected to several cycles of washing and centrifugation, or may be directly subjected to these washing cycles and centrifugation.

The precursor gel may also be recovered after centrifugation (for example between 3000 and 1500 rpm, for 5 to 60 minutes) and elimination of the supernatant (potassium sulfate solution) and washing with demineralised water (for example three washes and successive centrifugations).

The precursor gel washed and separated from the solution comprising potassium sulphate is then subjected to a solvothermal treatment as effected at the end of the last centrifugation, or possibly after having been dried (for example in an oven or by freeze-drying).

At least one hydroxide of formula AOH is then added to the precursor gel so that the molar ratio A/M is at least equal to t/z.

A suspension of precursor gel and hydroxyl AOH is thus obtained.

2/—Solvothermal Treatment of the Precursor Gel

The precursor gel as previously obtained (after the addition of the hydroxide of formula AOH) is subjected to a solvothermal treatment at a temperature of in particular between 300° C. and 600° C.

In a first variant of a method according to the invention, the solvothermal treatment of the precursor gel is carried out in a closed reactor.

To do this, the precursor gel is placed in a reactor/autoclave which is placed inside an oven at a predetermined reaction temperature (established between 300° C. and 600° C.), during the entire course of the solvothermal treatment.

Beforehand, the liquid/solid ratio may be adjusted to a value of between 2 and 80, in particular between 5 and 50 (the quantity of liquid being expressed in $cm^3$, and the quantity of solid, in grams, and denoting the amount of dry gel only).

In particular, it is preferable to place the reactor or the autoclave under the conditions of temperature and pressure of the solvothermal treatment for less than 6 hours, especially less than 3 hours, and more particularly less than one hour, after having added the hydroxide of formula AOH to the precursor gel.

During the hydrothermal treatment, the precursor gel gradually acquires a gelatinous consistency. The composition obtained at the end of the solvothermal treatment has an observable crystallinity in X-ray diffraction, this crystallinity increasing with the duration of the solvothermal treatment and results in the corresponding diffractograms with the rapid appearance of characteristic lines which are refined and intensify rapidly during treatment.

At the end of this solvothermal treatment, a composition is obtained comprising mineral particles of synthetic mica according to formula (I) of a compound according to the invention in suspension in a solution, in particular an aqueous solution. At the end of this solvothermal treatment, the composition contained in the reactor is recovered by centrifugation (between 3000 and 15000 rpm, for 5 to 60 minutes) and then elimination of the supernatant.

The composition comprising mineral particles recovered after the last centrifugation may then be dried:
in the oven at a temperature between 60° C. and 130° C., for 1 to 24 hours, or,
by lyophilization, for example in a freeze-dryer of the CHRIST ALPHA® 1-2 LD Plus type, for 48 hours to 72 hours,
or by atomization.

In a second variant of a method according to the invention, the solvothermal treatment of the precursor gel is carried out continuously.

In a method according to the invention in which the solvothermal treatment is carried out continuously, a reactor 15 for the preparation of mineral particles of a compound according to the invention is used continuously (as illustrated in FIG. 1) comprising:
a first portion 11 of conduit in which a first aqueous solution 20 comprising the precursor gel is introduced,
a second conduit portion 12 in which a second aqueous solution 21 comprising at least one hydroxide of formula AOH (KOH for example) is introduced,
a third conduit portion 13 arranged after the first conduit portion 11 and the second conduit portion 12 and extending to an inlet 9 of a reaction chamber 16, the first conduit portion 11 and the second conduit portion 12 joining at a point 17 from which the third conduit portion 13 begins,
a reaction conduit 14 extending from the inlet 9 into the reaction chamber 16, and after the third conduit portion 13.

A peristaltic pump 18 continuously feeds the first conduit portion 11 with the first aqueous solution contained in a tank 30 with stirring. A second peristaltic pump 19 continuously feeds the second conduit portion 12 with the second aqueous solution 21 contained in a tank 31 with stirring.

Alternatively, the hydroxide of the formula AOH may also be added to the precursor gel in the reservoir 30, water allowing adjustment of the dilution of the precursor gel that may be disposed in the reservoir 31.

For the purposes of controlling the temperature within the reaction conduit 14, the reaction chamber 16 is an oven comprising a heating sleeve comprising resistors of ceramic material. The reaction conduit 14 is in the general shape of a coil wound in multiple turns inside the heating sleeve, until it leaves the latter through an outlet 8 constituting the outlet of the reaction chamber 16.

The mixture inside the third conduit portion 13 is close to ambient temperature. The third conduit portion 13 is optional, and the point 17 and the input 9 may be combined. In the embodiment shown in FIG. 1, the third conduit portion 13 has, for example, a length of between 10 cm and 20 cm.

The total residence time in the device for preparing synthetic mineral particles by a method according to the invention is less than 30 minutes, and in particular less than 15 minutes, or even less than 5 minutes, or of the order of one minute.

In addition, it is possible to introduce other solutions and, in particular, to adjust the amount of solvent at different levels of the device, for example using inlets 4, 5 located before the solvothermal treatment zone, the inlet 4 being located before the point 17, while the inlet 6 is located at the level of the solvothermal treatment zone, while the inlet 7 is located after the outlet of the solvothermal treatment zone and before the outlet of the suspension obtained.

A pressure regulator 2 is disposed downstream of the reaction chamber 16 in connection with a fifth conduit portion 10 extending from the outlet 8 of the reaction conduit 14 and the reaction vessel 16 to a vessel 25 in which a suspension comprising the mineral particles obtained is recovered.

Closing a valve 32 interposed on the fifth conduit portion 10 makes it possible to circulate the suspension obtained at the outlet 8 of the conduit 14 in a reaction circuit 33 arranged to pass this suspension through a porous sinter 34 that is adapted to retain the particles and allow their recovery. The porous sinter 34 is immersed in an ice container 35 to cool the suspension leaving the reactor. In this case, valves 36 and 37 that are arranged on the branch circuit 33 are open. The porous sinter 34 is chosen to retain the synthesized mineral particles by separating them from the liquid medium which carries them. The sintered material is, for example, made of 316 L stainless steel, with a porosity of 50 μm. When the porous sinter 34 is clogged with mineral particles, it is sufficient to open the valve 32 and to close the valves 36 and 37 in order to directly recover the suspension in the container 25, this suspension being cooled by passing it through the ice container 35, then washed and centrifuged several times in order to recover the mineral particles which may then be dried, for example in an oven. In another variant (not shown), it is, of course, also possible to provide several sinters in parallel, which allows the suspension obtained to be directed towards the outlet of the reaction conduit 14 and to another sinter as soon as the previous sinter is clogged by the mineral particles.

Alternatively, in the case where a solution comprising the precursor gel and the hydroxide of formula AOH is initially prepared, the same and only portion of the conduit replaces the first conduit portion 11 and the second conduit portion 12. In another variant, it is also possible for the tank 30 to contain a solution comprising the precursor gel and for the tank 31 to contain the hydroxide of formula AOH.

In each case, it is important to control the dilution of the precursor gel introduced into each portion of the conduit and into the reaction conduit 14 in order to allow continuous circulation of the reaction medium in the reaction conduit 14, and in all the conduits feeding the precursor gel composition to the inlet 9 of the reaction chamber 16. The concentration of precursor gel in the precursor gel composition introduced at the inlet of the reaction chamber 16 is advantageously between $10^{-3}$ mol/L and several mol/L, for example of the order of 0.01 mol/L. Note that this concentration is much lower than the concentrations used in the methods for preparing synthetic mineral particles such as phyllosilicates of the prior art.

The solvothermal treatment carried out in the reaction conduit 14 is a solvothermal treatment which may, in particular, be carried out under supercritical or subcritical conditions, and, in particular, under homogeneous subcritical conditions. Thus, it is possible to choose the temperature and the pressure at which this solvothermal treatment is carried out so that the precursor gel composition introduced at the reactor inlet, and in particular the solvent(s) it comprises is under supercritical conditions or under homogeneous subcritical conditions, i.e. above the liquid-gas equilibrium curve of the solvent, so that the solvent is present in the liquid state and not in the form of a liquid-gas mixture or gas alone.

At the end of this solvothermal treatment, a suspension is obtained comprising mineral particles in solution, in particular in aqueous solution. At the end of this solvothermal treatment, the suspension obtained is recovered by filtration, for example using a ceramic sinter, or else by centrifugation (between 3000 and 15000 rpm, for 5 to 60 minutes) then elimination of the supernatant.

The composition comprising recovered mineral particles may optionally be washed with water, in particular with distilled or osmosis water, for example by carrying out one or two washing/centrifugation cycles.

The composition comprising mineral particles recovered after the last centrifugation may then be dried:
- in the oven at a temperature between 60° C. and 130° C., for 1 to 24 hours, or,
- by lyophilization, for example in a CHRIST ALPHA® 1-2 LD Plus lyophilizer, for 48 hours to 72 hours,
- by irradiation of microwaves,
- by atomization,
- or by any other powder drying technique.

The inventors have thus been able to note that not only an extremely short time (less than one minute) of solvothermal treatment under supercritical conditions is sufficient to allow conversion of the initial gel into a crystallized and thermally stable material, but also that the synthetic mineral particles obtained have a crystallinity comparable to that of natural micas.

The mineral particles contained in a composition obtained by a method according to the invention have remarkable properties in terms of purity, crystallinity and thermal stability, and for an extremely short duration of solvothermal treatment.

B—ANALYSIS AND STRUCTURAL CHARACTERIZATION

1—X-Ray Diffraction Analysis

FIGS. 2, 4 and 6 to 11 show X-ray diffractograms, each of which shows the relative intensity of the signal (number of strokes per second) as a function of the inter-reticular angstrom distance.

A compound according to the invention has, in X-ray diffraction, at least one diffraction line that is characteristic of a plane (001) located at a distance of between 9.80 Å and 10.20 Å. Such a diffraction line is characteristic of micas.

FIGS. 2, 4 and 6 to 11 respectively show the results of analyses carried out in X-ray diffraction on:
- a synthetic mica composition comprising a compound of formula $K_{0.3}Si_4Mg_{2.7}O_{10}(OH)_2$ obtained after a 24-hour hydrothermal treatment at 300° C. (FIG. 2),
- a synthetic mica composition comprising a compound of formula $K_{0.3}Si_4Ni_{1.35}Mg_{1.35}O_{10}(OH)_2$ obtained after a 24-hour hydrothermal treatment at 300° C. followed by an anhydrous heat treatment at 550° C. for 5 hours (FIG. 4),
- a synthetic mica composition comprising a compound of formula $K_{0.3}Si_4Ni_{1.35}Mg_{1.35}O_{10}(OH)_2$ obtained after a 24-hour hydrothermal treatment at 300° C. (FIG. 6),
- a synthetic mica composition comprising a compound of formula $K_{0.3}Si_4Ni_{1.35}Mg_{1.35}O_{10}(OH)_2$ obtained after a 24-hour hydrothermal treatment at 300° C. followed by an anhydrous heat treatment at 550° C. for 5 hours (FIG. 7),
- a synthetic mica composition comprising a compound of formula $Li_{0.3}Si_4Mg_{2.7}O_{10}(OH)_2$ obtained after a 24-hour hydrothermal treatment at 300° C. (FIG. 8),
- a synthetic mica composition comprising a compound of formula $Li_{0.3}Si_4Mg_{2.7}O_{10}(OH)_2$ obtained after a 24-hour hydrothermal treatment at 300° C. followed by an anhydrous heat treatment at 550° C. for 5 hours (FIG. 9),
- a synthetic mica composition comprising a compound of formula $KSi_4Mg_{2.5}O_{10}(OH)_2$ obtained after a 24-hour hydrothermal treatment at 300° C. (FIG. 10),
- a synthetic mica composition comprising a compound of formula $KSi_4Mg_{2.5}O_{10}(OH)_2$ obtained after a 24-hour hydrothermal treatment at 300° C. followed by an anhydrous heat treatment at 550° C. for 5 hours (FIG. 11).

The diffractogram RX shown in FIG. 2 was recorded on a CPS 120 device marketed by INEL (Artenay, France). It is a curved detector diffractometer allowing real-time detection over an angular range of 120°. The acceleration voltage used is 40 kV and the intensity is 25 mA. The Bragg relation giving the structural equidistance is: $d_{hkl}=0.89449/\sin \theta$ (with the use of a cobalt anticathode).

The X-ray diffractograms represented in FIGS. 4 and 6 to 11 were recorded on a Panalytical MPDPro® diffractometer sold by Panalytical® (The Netherlands). This is a theta/theta multiconfiguration diffractometer (transmission, reflection, variable temperature) equipped with a fast linear detector. The Bragg relation giving the structural equidistance is: $d_{hkl}=0.7703/\sin \theta$ (with the use of a copper anticathode).

2—Thermal Analyses

FIGS. 3 and 5 show curves obtained by thermogravimetric analysis (TGA) (curves 48 and 57) and by thermodifferential analysis (TDA) (curves 49 and 58) of a composition comprising a compound ($Al_2Si_2O_5(OH)_4$ according to the invention obtained after a hydrothermal treatment of 24 hours at 300° C. (FIG. 3) and the same composition was further subjected to an anhydrous heat treatment at 550° C. for 5 hours.

In FIGS. 3 and 5, the curves 49 and 58 (thermodifferential analysis, in solid lines in FIGS. 3 and 5) represent the heat released or absorbed by the analyzed composition sample (in mW on the y-axis located on the left side of the thermogram) as a function of the temperature (from 0° C. to 1,000° C.). In FIG. 3, the curves 48 and 57 (thermogravimetric analysis, in dashed lines in FIGS. 3 and 5) represent the mass variation of the composition sample analyzed (in % on the ordinate axis situated on the right side of the thermogram) as a function of the temperature (from 0° C. to 1,000° C.).

The thermograms obtained are characteristic of micas, with dehydroxylation starting at 550° C., and a phase transformation at around 800° C. The dehydroxylation temperature is slightly lower than for a natural mica, which is explained by the smaller size of the particles obtained.

The ATD and ATG analyses were carried out with a Diamond TG/TDA® thermobalance sold by PERKIN ELMER® (USA) in a temperature range extending from 30° C. to 1,000° C. under air, and with a heating rate of 10° C./min.

3—Microscopic Observations and Assessment of Particle Size

Given the great fineness of the powders that can constitute the compositions according to the invention, the size and particle size distribution of the mineral particles that compose them were assessed by observation using scanning electron microscopy and field effect and electron microscopy in transmission.

It can be seen that the average size of the elementary particles varies between 10 nm and 400 nm. In particular, the particles have a thickness of between 1 nm and 60 nm and a largest dimension of between 10 nm and 500 nm.

In addition, it has been observed that the synthetic mica particles prepared by a method according to the invention have a pearlescent effect which may be of interest in many industrial fields.

The following examples illustrate the preparation method according to the invention and the structural characteristics of the compounds thus obtained.

EXAMPLE 1

Preparation of a Composition Comprising Mineral Particles According to the Invention 300 ml of an aqueous solution of magnesium sulphate (33.27 g or 0.135 mol) and sulfuric acid (120 g of a 0.5M solution) are prepared.

A solution of potassium metasilicate is then prepared by diluting 59.35 g (i.e. 0.2 mol) of an aqueous solution of potassium metasilicate ($K_2SiO_3$) containing 52% solids in 150 ml of demineralized water. This solution of potassium metasilicate is added to the previous solution and a white precipitate is formed instantly.

The resulting suspension is stirred for 5 minutes. Three washing cycles are then carried out with distilled water and centrifugation at 8,000 rpm for 10 minutes each time the centrifugation is repeated. These successive washes with elimination of the supernatant solution after each centrifugation make it possible to remove the potassium sulphate formed during the precipitation reaction of the precursor gel. Finally, the recovered white precipitate is suspended in demineralised water to a final volume of 500 ml and subjected to ultrasound with magnetic stirring for 10 minutes until a homogeneous suspension of precursor gel with a white color is obtained.

988 mg of hydrated potassium hydroxide of formula KOH are then added to the precursor gel (containing 85% of potassium hydroxide and 15% of water, i.e. 0.015 mol of pure potassium hydroxide added) previously diluted in 30 ml of demineralized water, and the suspension obtained is stirred magnetically for 5 minutes at room temperature (22.5° C.).

The precursor gel placed in a closed titanium reactor placed in an oven is then subjected to a hydrothermal treatment at a temperature of 300° C. for 24 hours under the saturated vapor pressure of the water in the reactor.

After cooling to room temperature, the reactor is opened and the suspension obtained is centrifuged. After centrifugation, a composition comprising at least 80% by weight of particles of formula $K_{0.3}Si_4Mg_{2.7}O_{10}(OH)_2$ is obtained.

The composition of particles recovered after centrifugation is dried in an oven for 12 hours at 120° C. and then ground in a mortar. The resulting composition is in the form of a white powder.

The X-ray diffractogram of the composition of particles of formula $K_{0.3}Si_4Mg_{2.7}O_{10}(OH)_2$ thus obtained is shown in FIG. 2. The X-ray diffractogram of this composition has the following characteristic diffraction lines:

a plane (001) located at a distance of 10.15 Å (line 40);
a plane (002) located at a distance of 5.03 Å (line 41);
a plane (020) at a distance of 4.53 Å (line 42);
planes (003) and (022) located at a distance of 3.34 Å (line 43);
a plane (13$\bar{1}$) located at a distance of 2.60 Å (line 44);
a plane (005) located at a distance of 2.01 Å (line 45);
a plane (060) located at a distance of 1.52 Å (line 46).

Curves 48 and 49 obtained by TGA-TDA of the composition of particles of formula $K_{0.3}Si_4Mg_{2.7}O_{10}(OH)_2$ thus obtained are shown in FIG. 3. Such a thermogram is characteristic of micas, with a dehydroxylation from 550° C., and a phase transformation at 800° C. These transformation temperatures are slightly lower than for a natural mica because the size of the particles obtained is smaller.

The composition is then subjected to an anhydrous heat treatment at 550° C. in an oven for 5 hours. The composition obtained after the anhydrous heat treatment remains white.

The X-ray diffractogram of the composition of particles of formula $K_{0.3}Si_4Mg_{2.7}O_{10}(OH)_2$ obtained after an anhydrous heat treatment at 550° C. is shown in FIG. 4.

The X-ray diffractogram of this composition, after the anhydrous heat treatment, has the following characteristic diffraction lines:
- a plane (001) located at a distance of 10.24 Å (line 50);
- a plane (002) located at a distance of 5.02 Å (line 51);
- a plane (020) at a distance of 4.56 Å (line 52);
- planes (003) and (022) located at a distance of 3.37 Å (line 53);
- a plane (13$\bar{1}$) located at a distance of 2.60 Å (line 54);
- a plane (005) located at a distance of 2.02 Å (line 55);
- a plane (060) located at a distance of 1.52 Å (line 56).

As may be seen in FIG. 4 compared with FIG. 2, such an anhydrous heat treatment makes it possible to increase the proportion of synthetic mineral particles of formula $K_{0.3}Si_4Mg_{2.7}O_{10}(OH)_2$ in the composition obtained. In particular, it may be observed that the shoulder initially present at the base of the peak corresponding to the plane (001) in FIG. 2 has disappeared in FIG. 4.

The curves 57 and 58 obtained by TGA-TDA of the composition of particles of formula $K_{0.3}Si_4Mg_{2.7}O_{10}(OH)_2$ thus obtained after such an anhydrous heat treatment are shown in FIG. 5. As in FIG. 3, such a thermogram is characteristic of micas, with dehydroxylation from 550° C., and a phase transformation at 800° C. These transformation temperatures are slightly lower than for a natural mica because the size of the particles obtained is smaller.

In FIGS. 3 and 5, the curves 49 and 58 (thermodifferential analysis, in solid lines) represent the heat released or absorbed by the analyzed composition sample (in mW on the ordinate axis situated on the left side of the thermogram) as a function of the temperature. In FIG. 3, curves 48 and 57 (thermogravimetric analysis, in dotted lines) represent the mass variation of the analyzed composition sample (in % on the ordinate axis located on the right side of the thermogram) as a function of the temperature.

EXAMPLE 2

Preparation of a Composition Comprising Mineral Particles According to the Invention 300 ml of an aqueous solution of magnesium sulphate (16.64 g or 0.0675 mol), nickel sulphate (17.74 g or 0.0675 mol) and sulfuric acid (120 g of 0.5M solution) are prepared.

A solution of potassium metasilicate is then prepared by diluting 59.35 g (0.2 mol) of a first aqueous solution of potassium metasilicate at 52% solids in 150 ml of demineralized water. This solution of potassium metasilicate is added to the previous solution and a green precipitate is formed instantly.

The resulting suspension is stirred for 5 minutes. Three washing cycles are then carried out with distilled water and centrifugation at 8,000 rpm for 10 minutes each time the centrifugation is repeated. These successive washes with elimination of the supernatant solution after each centrifugation make it possible to eliminate the potassium sulphate formed during the precipitation reaction of the precursor gel. Finally, the recovered green precipitate is suspended in demineralized water to a final volume of 500 ml and subjected to ultrasound with magnetic stirring for 10 minutes until a homogeneous suspension of precursor gel of green color is obtained.

988 mg of hydrated potassium hydroxide (containing 85% of potassium hydroxide and 15% of water, i.e. 0.015 mol of pure potassium hydroxide added), previously diluted in 30 ml of demineralized water, are then added to the precursor gel, and the suspension obtained is stirred magnetically for 5 minutes at room temperature (22.5° C.).

The precursor gel placed in a closed titanium reactor placed in an oven is then subjected to a hydrothermal treatment at a temperature of 300° C. for 24 hours under the saturated vapor pressure of the water in the reactor.

After cooling to room temperature, the reactor is opened and the resulting suspension is centrifuged. After centrifugation, a composition comprising at least 80% by weight of particles of compound of formula $K_{0.3}Si_4Ni_{1.35}Mg_{1.35}O_{10}(OH)_2$.

The composition of particles recovered after centrifugation is dried in an oven for 12 hours at 120° C. and then ground in a mortar. The particle composition obtained after drying is in the form of a green powder.

The X-ray diffractogram of the composition of particles of formula $K_{0.3}Si_4Ni_{1.35}Mg_{1.35}O_{10}(OH)_2$ thus obtained is shown in FIG. 6. The X-ray diffractogram of this composition shows the following characteristic diffraction lines:
- a plane (001) located at a distance of 9.70 Å (line 60);
- a plane (020) located at a distance of 4.48 Å (line 61);
- planes (003) and (022) located at a distance of 3.27 Å (line 62);
- a plane (13$\bar{1}$) located at a distance of 2.58 Å (line 63);
- a plane (060) located at a distance of 1.51 Å (line 64).

The composition is then subjected to an anhydrous heat treatment at 550° C. in an oven for 5 hours.

The X-ray diffractogram of the composition of the formula $K_{0.3}Si_4Ni_{1.35}Mg_{1.35}O_{10}(OH)_2$ obtained after an anhydrous heat treatment at 550° C. is shown in FIG. 7. The X-ray diffractogram of this composition has the following characteristic diffraction lines:
- a plane (001) located at a distance of 9.95 Å (line 65);
- a plane (020) located at a distance of 4.48 Å (line 66);
- planes (003) and (022) located at a distance of 3.27 Å (line 67);
- a plane (13$\bar{1}$) located at a distance of 2.58 Å (line 68);
- a plane (060) located at a distance of 1.51 Å (line 69).

As may be seen in FIG. 7 compared with FIG. 6, such an anhydrous heat treatment makes it possible to increase the crystallinity of the particles of the composition obtained. In particular, it may be seen that the peak corresponding to the (001) plane has increased in intensity and has become finer.

EXAMPLE 3

Preparation of a Composition Comprising Mineral Particles According to the Invention 300 ml of an aqueous solution of magnesium sulphate (33.27 g or 0.135 mol) and sulfuric acid (120 g of a 0.5M solution) are prepared.

A solution of potassium metasilicate is then prepared by diluting 59.35 g (i.e. 0.2 mol) of an aqueous solution of potassium metasilicate ($K_2SiO_3$) containing 52% solids in 150 ml of demineralized water. This solution of potassium metasilicate is added to the previous solution and a white precipitate is formed instantly.

The resulting suspension is stirred for 5 minutes. Three washing cycles are then carried out with distilled water and centrifugation at 8,000 rpm for 10 minutes at each repeated centrifugation. These successive washes with elimination of the supernatant solution after each centrifugation make it possible to eliminate the potassium sulphate formed during the precipitation reaction of the precursor gel. Finally, the recovered precipitate is suspended in demineralized water to a final volume of 500 ml and subjected to ultrasound with magnetic stirring for 10 minutes until a homogeneous suspension of precursor gel with a white color is obtained.

629 mg of lithium hydroxide (LiOH) (i.e. 0.015 mol of LiOH), previously diluted in 30 ml of demineralized water, are then added to the precursor gel, and the suspension obtained is stirred magnetically for 5 minutes at room temperature (22.5° C.).

The precursor gel placed in a closed titanium reactor placed in an oven is then subjected to a hydrothermal treatment at a temperature of 300° C. for 24 hours under the saturated vapor pressure of the water in the reactor.

After cooling to room temperature, the reactor is opened and the suspension obtained is centrifuged. After centrifugation, a composition comprising at least 80% by weight of particles of compound of formula $L_{0.3}Si_4Mg_{2.7}O_{10}(OH)_2$ is recovered.

The composition of particles recovered after centrifugation is dried in an oven for 12 hours at 120° C. and then ground in a mortar. The particle composition obtained after drying is in the form of a white powder.

The X-ray diffractogram of the composition of particles of compound of formula $L_{0.3}Si_4Mg_{2.7}O_{10}(OH)_2$, thus obtained is shown in FIG. 8. The X-ray diffractogram of this composition has the following characteristic diffraction lines:
- a plane (001) located at a distance of 10.28 Å (line 70);
- a plane (002) located at a distance of 4.94 Å (line 71);
- a plane (020) located at a distance of 4.48 Å (line 72);
- planes (003) and (022) located at a distance of 3.30 Å (line 73);
- a plane (13$\bar{1}$) located at a distance of 2.60 Å (line 74);
- a plane (060) located at a distance of 1.51 Å (line 75).

The composition is then subjected to an anhydrous heat treatment at 550° C. in an oven for 5 hours.

The X-ray diffractogram of the composition of particles of compound of formula $Li_{0.3}Si_4Mg_{2.7}O_{10}(OH)_2$ thus obtained after an anhydrous heat treatment at 550° C. is shown in FIG. 9. The X-ray diffractogram of this composition exhibits, after the anhydrous heat treatment, the following characteristic diffraction lines:
- a plane (001) located at a distance of 10.12 Å (line 76);
- a plane (002) located at a distance of 4.95 Å (line 77);
- a plane (020) located at a distance of 4.50 Å (line 78);
- planes (003) and (022) located at a distance of 3.30 Å (line 79);
- a plane (13$\bar{1}$) located at a distance of 2.59 Å (line 80);
- a plane (060) located at a distance of 1.52 Å (line 81).

As may be seen in FIG. 9 compared with FIG. 8, such an anhydrous heat treatment makes it possible to increase the crystallinity of the particles of the composition obtained. In particular, it may be seen that the peak corresponding to the (001) plane has increased in intensity and has become finer.

EXAMPLE 4

Preparation of a Composition Comprising Mineral Particles According to the Invention 300 ml of an aqueous solution of magnesium sulphate (30.81 g or 0.125 mol) and sulfuric acid (120 g of a 0.5M solution) are prepared.

A solution of potassium metasilicate is then prepared by diluting 59.35 g (i.e. 0.2 mol) of an aqueous solution of potassium metasilicate ($K_2SiO_3$) containing 52% solids in 150 ml of demineralized water. This solution of potassium metasilicate is added to the previous solution and a white precipitate is formed instantly.

The resulting suspension is stirred for 5 minutes. Three washing cycles are then carried out with distilled water and centrifugation at 8,000 rpm for 10 minutes at each repeated centrifugation. These successive washes with elimination of the supernatant solution after each centrifugation make it possible to eliminate the potassium sulphate formed during the precipitation reaction of the precursor gel. Finally, the recovered white precipitate is suspended in demineralised water to a final volume of 500 ml and subjected to ultrasound with magnetic stirring for 10 minutes until a homogeneous suspension of precursor gel with a white color is obtained.

3.42 g of hydrated potash of formula KOH (containing 85% of potassium hydroxide and 15% of water, i.e. 0.052 mol of pure potassium hydroxide added), previously diluted in 30 ml of demineralized water, are and the suspension obtained is stirred magnetically for 5 minutes at room temperature (22.5° C.).

The precursor gel placed in a closed titanium reactor placed in an oven is then subjected to a hydrothermal treatment at a temperature of 300° C. for 24 hours under the saturated vapor pressure of the water in the reactor.

After cooling to room temperature, the reactor is opened and the resulting suspension is centrifuged. After centrifugation, a composition comprising at least 80% by weight of particles of compound of formula $KSi_4Mg_{2.7}O_{10}(OH)_2$ is recovered.

The composition of particles recovered after centrifugation is dried in an oven for 12 hours at 120° C. and then ground in a mortar. The resulting composition is in the form of a white powder.

The X-ray diffractogram of the composition of particles of compound of formula $KSi_4Mg_{2.7}O_{10}(OH)_2$ thus obtained is represented in FIG. 10. The X-ray diffractogram of this composition has the following characteristic diffraction lines:
- a plane (001) located at a distance of 10.14 Å (line 85);
- a plane (002) located at a distance of 5.04 Å (line 86);
- a plane (020) located at a distance of 4.51 Å (line 87);
- a plane (003) located at a distance of 3.33 Å (line 88);
- a plane (13$\bar{1}$) located at a distance of 2.30 Å (line 89);
- a plane (060) located at a distance of 1.52 Å (line 90).

The composition is then subjected to an anhydrous heat treatment at 550° C. in an oven for 4 hours. The composition obtained after the anhydrous heat treatment remains white.

The X-ray diffractogram of the composition of particles of the formula $KSi_4Mg_{2.7}O_{10}(OH)_2$ obtained after an anhydrous heat treatment at 550° C. is shown in FIG. 11. The X-ray diffractogram of this composition shows, after the anhydrous heat treatment, the following characteristic diffraction lines:
- a plane (001) located at a distance of 10.12 Å (line 91);
- a plane (002) located at a distance of 5.09 Å (line 92);
- a plane (020) located at a distance of 4.52 Å (line 93);
- a plane (003) located at a distance of 3.40 Å (line 94);
- a plane (13$\bar{1}$) located at a distance of 2.60 Å (line 95);
- a plane (060) located at a distance of 1.52 Å (line 96).

As may be seen in FIG. 11 compared with FIG. 10, such an anhydrous heat treatment makes it possible to increase the crystallinity of the particles of the composition obtained. In particular, it may be seen that the peak corresponding to the (001) plane has increased in intensity and has become finer.

EXAMPLE 5

Continuous Preparation of a Composition Comprising Synthetic Mineral Particles According to the Invention 300 ml of an aqueous solution of magnesium sulphate (33.27 g or 0.135 mol) and sulfuric acid (120 g of a 0.5M solution) are prepared.

A solution of potassium metasilicate is then prepared by diluting 59.35 g (i.e. 0.2 mol) of an aqueous solution of potassium metasilicate ($K_2SiO_3$) containing 52% solids in 150 ml of demineralized water. This solution of potassium metasilicate is added to the previous solution and a white precipitate is formed instantly.

The resulting suspension is stirred for 5 minutes. Three washing cycles are then carried out with distilled water and centrifugation at 8,000 rpm for 10 minutes at each repeated centrifugation. These successive washes with elimination of the supernatant solution after each centrifugation make it possible to eliminate the potassium sulphate formed during the precipitation reaction of the precursor gel. Finally, the recovered white precipitate is suspended in demineralised water to a final volume of 500 ml and subjected to ultrasound with magnetic stirring for 10 minutes until a homogeneous suspension of precursor gel with a white color is obtained.

988 mg of hydrated potassium hydroxide (containing 85% of potassium hydroxide and 15% of water, i.e. 0.015 mol of added pure potassium hydroxide), previously diluted in 30 ml of demineralized water, are then added to the precursor gel, and the suspension obtained is stirred magnetically for 5 minutes at room temperature (22.5° C.).

The precursor gel diluted in 300 ml of pure water is then placed in the tank 30 (see FIG. 1) Pure water which also makes it possible to adjust, if necessary, the dilution of the precursor gel in the portion 13 of the conduit 20 is placed in the tank 31.

The peristaltic pumps 18, 19 make it possible to convey the two solutions separately via steel conduits having an outer diameter of ⅛ of an inch (3.175 mm) and an internal diameter of 1.57 mm, and at a flow rate of 2 mL/min each, i.e. a total flow of 4 mL/min at point 17 where the mixture of the solution containing the precursor gel and pure water occurs continuously, a few centimeters before the inlet 9 of the reaction conduit 14. The temperature in the chamber 16 is 400° C., and the pressure in the reaction conduit 14 is maintained (by virtue of the pressure regulator 2) greater than 22.1 MPa (of the order of 25 MPa), so that the reaction medium which circulates inside the reaction conduit 14 in the enclosure 16 is under conditions above the critical point of water (374° C., 221 bar).

The precursor gel thus undergoes a hydrothermal treatment in the reaction chamber 16, which makes it possible to convert this precursor gel into a suspension of synthetic mineral particles of the formula $K_{0.3}Si_4Mg_{2.7}O_{10}(OH)_2$. The residence time in the reaction conduit 14 between the inlet 9 and the outlet 8 is 40 seconds.

After cooling, the suspension exiting the outlet 8 of the reactor 15 is a colloidal suspension of synthetic mineral particles of the formula $K_{0.3}Si_4Mg_{2.7}O_{10}(OH)_2$. It has the appearance of a white milky composition which decays in several tens of minutes This suspension is subjected to a centrifugation cycle (10 min at 8,000 rpm). After centrifugation, on the one hand, a composition comprising synthetic mineral particles of formula $KSi_4Mg_{2.7}O_{10}(OH)_2$, and, on the other hand, a supernatant aqueous solution, is obtained.

The composition of particles recovered after centrifugation is dried in an oven (120° C. for 12 hours) and then ground with a mortar. The resulting composition is in the form of a white powder.

The X-ray diffractogram of the composition of particles of formula $K_{0.3}Si_4Mg_{2.7}O_{10}(OH)_2$ has the following characteristic diffraction lines:
- a plane (001) located at a distance of 10.65 Å;
- a plane (002) located at a distance of 5.06 Å;
- a plane (020) located at a distance of 4.55 Å;
- planes (003) and (022) located at a distance of 3.35 Å;
- a plane (13$\bar{1}$) located at a distance of 2.62 Å;
- a plane (060) located at a distance of 1.53 Å.

The invention may be subject to many variants. In particular, it is possible to prepare other compounds than those exemplified and corresponding to formula (I) by varying the nature of the metal salts and the hydroxide employed or also by using a source of germanium in addition to a silicon source during the preparation of the precursor gel.

The invention claimed is:

1. A non-fluorinated synthetic mica compound having the following formula (I):

$$A_t(Si_xGe_{1-x})_4M_zO_{10}(OH)_2 \quad (I)$$

wherein:

A is at least one monovalent interfoliary cation of a metal element having the formula $Li_{w(1)}Na_{w(2)}K_{w(3)}Rb_{w(4)}Cs_{w(5)}$; wherein each w(i) represents a real number of the interval [0; 1], such that $\Sigma_{i=1}^{5}w(i)=1$, t is a real number of the interval [0.3; 1], x is a real number of the interval [0; 1], M is at least one divalent metal having the formula $$Mg_{y(1)}Co_{y(2)}Zn_{y(3)}Cu_{y(4)}Mn_{y(5)}Fe_{y(6)}Ni_{y(7)}Cr_{y(8)};$$

wherein each y(i) represents a real number of the interval [0; 1], such that $\Sigma_{i=1}^{8}y(i)=1$ z is a real number in the range [2.50; 2.85], and t+2z is a real number of the interval [5.3; 6.0].

2. The non-fluorinated synthetic mica compound according to claim 1, wherein y(3) is different from 1.

3. The non-fluorinated synthetic mica compound according to claim 1, wherein in formula (I), A denotes potassium.

4. The non-fluorinated synthetic mica compound according to claim 1, wherein it has, in X-ray diffraction, at least one diffraction line characteristic of a plane (001) located at a distance of between 9.70 Å and 10.70 Å.

5. The non-fluorinated synthetic mica compound according to claim 1, wherein said compound is organized according to a solid structure formed of sheets separated from each other by at least one interfoliary space, each cation A being disposed in said interfoliary spaces.

6. A composition comprising at least one non-fluorinated synthetic mica compound according to claim 1.

7. The composition according to claim 6, wherein the composition is free of iron.

8. The composition according to claim 6, wherein the composition is free of aluminum.

9. The composition according to claim 6, wherein the composition comprises particles of said compound having an average size of between 10 nm and 400 nm, as observed by electron microscopy.

10. A method for preparing a compound of following formula (I):

$$A_t(Si_xGe_{1-x})_4M_zO_{10}(OH)_2 \quad (I)$$

wherein:
A is at least one monovalent interfoliary cation of a metal element having the formula $Li_{w(1)}Na_{w(2)}K_{w(3)}Rb_{w(4)}Cs_{w(5)}$; wherein each w(i) represents a real number of the interval [0; 1], such that $\Sigma_{i=1}^{5} w(i)=1$,
t is a real number of the interval [0.3; 1],
x is a real number of the interval [0; 1],
M is at least one divalent metal having the formula

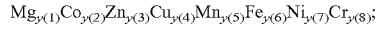

wherein each y(i) represents a real number of the interval [0; 1], such that $\Sigma_{i=1}^{8} y(i)=1$
z is a real number in the range [2.50; 2.85], and
t+2z is a real number of the interval [5.3; 6.0];
said method comprising:
preparing a precursor gel of the compound of formula (I) by a co-precipitation reaction between:
at least one source of at least one chemical element selected from the group consisting of silicon and germanium, said source of the chemical element selected from the group consisting of silicon and germanium being selected from the group consisting of potassium metasilicate and potassium metagermanate,
at least one metal salt of the divalent metal M,
the molar proportion $(Si_xGe_{1-x})/M$ during the preparation of the precursor gel being in the range [2/1.425; 1.6]
adding at least one hydroxide of formula AOH to the precursor gel so that the molar proportion of A/M is at least equal to t/z, and
carrying out a solvothermal treatment of the precursor gel at a temperature of between 300° C. and 600° C.

11. The method according to claim 10, wherein, prior to said solvothermal treatment and following the precipitation of the precursor gel, the precursor gel is washed with a rinsing fluid.

12. The method according to claim 10, wherein said solvothermal treatment is carried out continuously.

13. The method according to claim 10, wherein said solvothermal treatment is carried out in aqueous medium.

14. The method according to claim 10, wherein after said solvothermal treatment, an anhydrous thermal treatment is carried out at a temperature between 500° C. and 600° C.

15. The method according to claim 11, wherein the rinsing fluid is water.

* * * * *